United States Patent
Ejiri et al.

(10) Patent No.: US 10,356,196 B2
(45) Date of Patent: Jul. 16, 2019

(54) APPARATUS AND METHOD FOR MANAGING DEVICES

(71) Applicant: FUJITSU LIMITED, Kawasaki-shi, Kanagawa (JP)

(72) Inventors: Yusuke Ejiri, Kawasaki (JP); Takeshi Fujiwara, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 579 days.

(21) Appl. No.: 14/827,921

(22) Filed: Aug. 17, 2015

(65) Prior Publication Data

US 2016/0127143 A1    May 5, 2016

(30) Foreign Application Priority Data

Oct. 29, 2014 (JP) ................. 2014-220862

(51) Int. Cl.
*H04L 29/08* (2006.01)

(52) U.S. Cl.
CPC ........ *H04L 67/2842* (2013.01); *H04L 67/325* (2013.01); *G05B 2219/2642* (2013.01)

(58) Field of Classification Search
None
See application file for complete search history.

(56) References Cited

U.S. PATENT DOCUMENTS

| 6,167,438 | A |    | 12/2000 | Yates et al. |
| 7,383,329 | B2 | *  | 6/2008 | Erickson ................. H04L 29/06 709/223 |
| 8,972,517 | B2 | *  | 3/2015 | Black ..................... H04L 67/06 709/214 |
| 2010/0004763 | A1 |  | 1/2010 | Murakami et al. |

FOREIGN PATENT DOCUMENTS

| JP | 2001-526814 | 12/2001 |
| JP | 2010-245681 | 10/2010 |
| WO | 98/53410 | 11/1998 |
| WO | 2006-126355 | 11/2006 |

\* cited by examiner

*Primary Examiner* — Raj R Gupta
(74) *Attorney, Agent, or Firm* — Fujitsu Patent Center

(57) ABSTRACT

A proxy device management apparatus includes: an attribute information storage that stores attribute information obtained from a management target device and information indicating a reception time of the attribute information; and a processor that performs a first operation or a second operation according to a difference between the reception time of the attribute information and a reception time of an obtaining request of the attribute information when the proxy device management apparatus receives the obtaining request from a device management apparatus. The first operation includes transmitting the attribute information stored in the attribute information storage to the device management apparatus. The second operation includes obtaining the attribute information corresponding to the obtaining request from the management target device and transmitting the obtained attribute information to the device management apparatus.

11 Claims, 19 Drawing Sheets

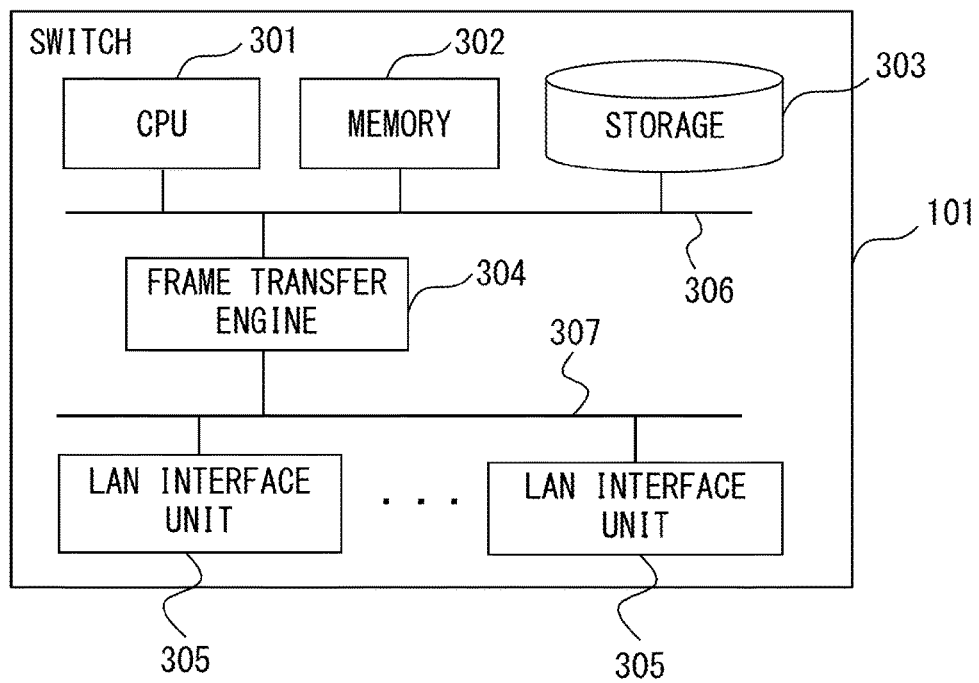
F I G. 3A
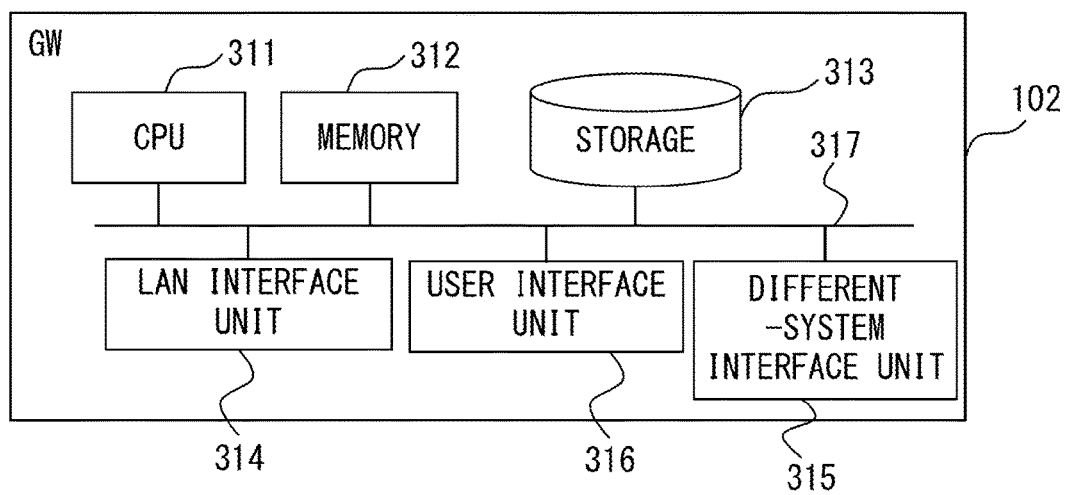
F I G. 3B

| DEVICE TYPE | MAC ADDRESS | IP ADDRESS | EOJ | PROPERTY NAME | VALUE | DATE AND TIME OF UPDATE |
|---|---|---|---|---|---|---|
| DEVICE (#1) | AA:AA:AA:AA:AA:AA | 192.168.10.11 | 0x013001 | OPERATION STATUS | ON | 2014/1/24 10:15 |
| | | | | SET TEMPERATURE | 26 deg. | 2014/1/24 10:15 |
| | | | | TEMPERATURE | 28 deg. | 2014/1/24 10:15 |
| | | | | TIMER SETTING | ON | 2014/1/24 9:30 |
| | | | | OPERATION STATUS | ON | 2014/1/24 10:15 |
| | | | | : | : | : |
| DEVICE (#2) | BB:BB:BB:BB:BB:BB | 192.168.10.12 | 0x013002 | CPU USAGE RATE | 15% | 2014/1/24 10:15 |
| | | | | OPERATING TIME | 8h | 2014/1/24 10:15 |
| | | | | ACCUMULATED NUMBER OF ERRORS | 52 TIMES | 2014/1/24 9:30 |
| | | | | MEMORY REMAINING CAPACITY | 1.2GB | 2014/1/24 9:30 |
| : | : | : | : | : | : | : |
| CONTROLLER (#1) | DD:DD:DD:DD:DD:01 | 192.168.10.51 | 0x05FF01 | CACHE VALUE ALLOWABLE TIME | 5 sec. | 2014/1/1 9:00 |
| CONTROLLER (#2) | DD:DD:DD:DD:DD:02 | 192.168.10.52 | 0x05FF02 | CACHE VALUE ALLOWABLE TIME | 60 sec. | 2014/1/1 9:00 |
| CONTROLLER (#3) | DD:DD:DD:DD:DD:03 | 192.168.10.53 | 0x05FF03 | CACHE VALUE ALLOWABLE TIME | 1 sec. | 2014/1/1 9:00 |

FIG. 4

| DEVICE TYPE | EOJ | OPERATION STATUS | PRODUCTION CODE | ... | CACHE VALUE ALLOWABLE TIME |
|---|---|---|---|---|---|
| CONTROLLER | 0x05FF01 | ON | XXXXX | ... | 5 sec. |

F I G. 5

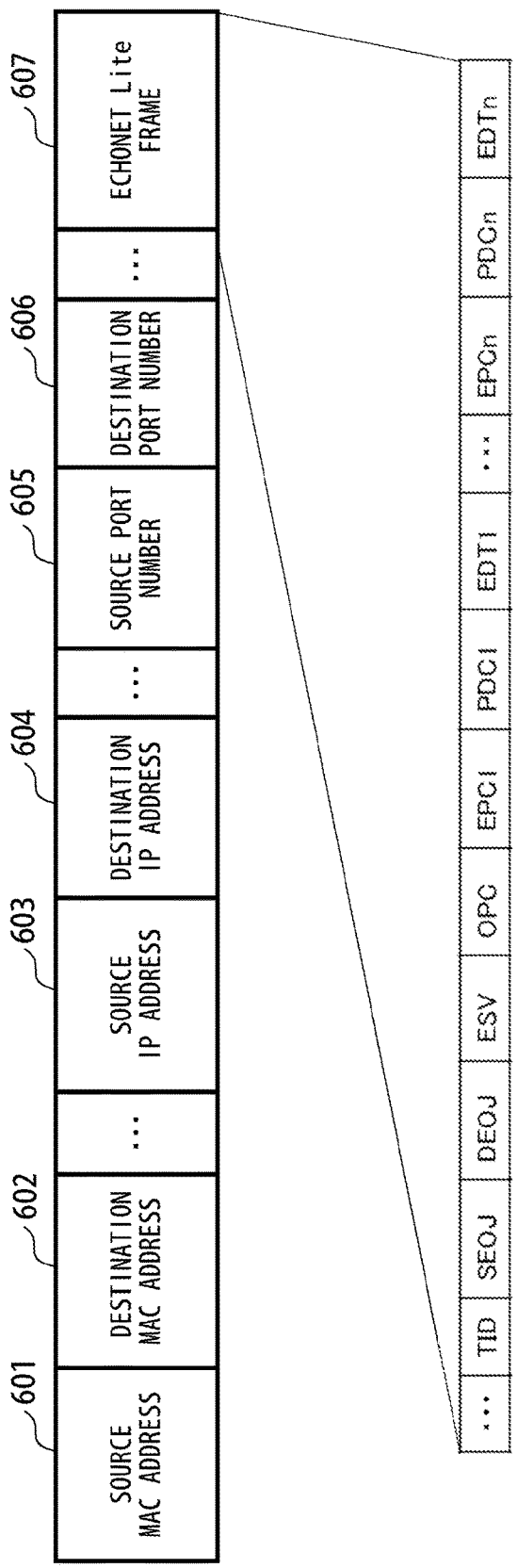
F I G. 6

APPARATUS AND METHOD FOR MANAGING DEVICES

CROSS-REFERENCE TO RELATED APPLICATION

This application is based upon and claims the benefit of priority of the prior Japanese Patent Application No. 2014-220862, filed on Oct. 29, 2014, the entire contents of which are incorporated herein by reference.

FIELD

The embodiments discussed herein are related to an apparatus and a method used in a device management system that obtains data from a management target device such as a sensor, a home appliance, etc. in a house and controls the device based on the obtained data.

BACKGROUND

In recent years, a device, called a home gateway device or a gateway device (referred to as a "GW" hereinafter), is known that connects a home network in a house such as a residence, a building, etc. and an external network such as the Internet etc. (for example Japanese Laid-open Patent Publication No. 2010-245681 and Japanese National Publication of International Patent Application No. 2001-526814).

For example, a service that uses application software operating in a server or a gateway device in the Internet conducts, through a GW, data collection or control on a management target device such as a sensor, a home appliance, etc. connected to the home network. More specifically, in an example of the service, a home appliance in a house is controlled from outside of the house via the Internet. In another example of the service, an electric power company or a gas company remotely reads the usage meter in each contracted house.

When a plurality of services of this type are used in one home network, there can be a case where a plurality of GWs are connected to one home network and data collection is conducted on one management target device by the plurality of GWs.

Note that a technique is known that uses an automatic cache method, a transparent cache method and a distributed cache method provided along the path from a client to the home server in a network (for example WO2006/126355).

When data collection is conducted on one management target device by a plurality of GWs, there is a possibility that a plurality of data obtain messages are transmitted to one management target device from the plurality of GWs in a short period of time. Since there can be various types of management target devices, some management target devices may have insufficient hardware resources such as reception buffers etc. In such a case, there is a possibility that when for example a plurality of data obtain messages concentrate in one management target device and a number of packets exceeding the number that can be stored by the reception buffer have been received, an overflow occurs in the reception buffer and the packets are discarded, which affects the services.

As a countermeasure against an overflow in a reception buffer, a method size of the reception buffer may be increased so as to store more number of messages. However, it is difficult in practice to realize this method because home network systems usually use existing home appliances or sensor devices, making it impossible to modify the hardware.

SUMMARY

According to an aspect of the embodiments, a proxy device management apparatus includes: an attribute information storage that stores attribute information obtained from a management target device and information indicating a reception time of the attribute information; and a processor that performs a first operation or a second operation according to a difference between the reception time of the attribute information and a reception time of an obtaining request of the attribute information when the proxy device management apparatus receives the obtaining request from a device management apparatus. The first operation includes transmitting the attribute information stored in the attribute information storage to the device management apparatus. The second operation includes obtaining the attribute information corresponding to the obtaining request from the management target device and transmitting the obtained attribute information to the device management apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3A and FIG. 3B illustrate hardware configuration example of the switch and the GW;

FIG. 4 illustrates a data configuration example of a device data management table;

FIG. 5 illustrates a data configuration example of an ECHONET Lite object data management table;

FIG. 6 illustrates an example of an Ethernet frame data storing an ECHONET Lite frame;

DESCRIPTION OF EMBODIMENTS

Figure 1:
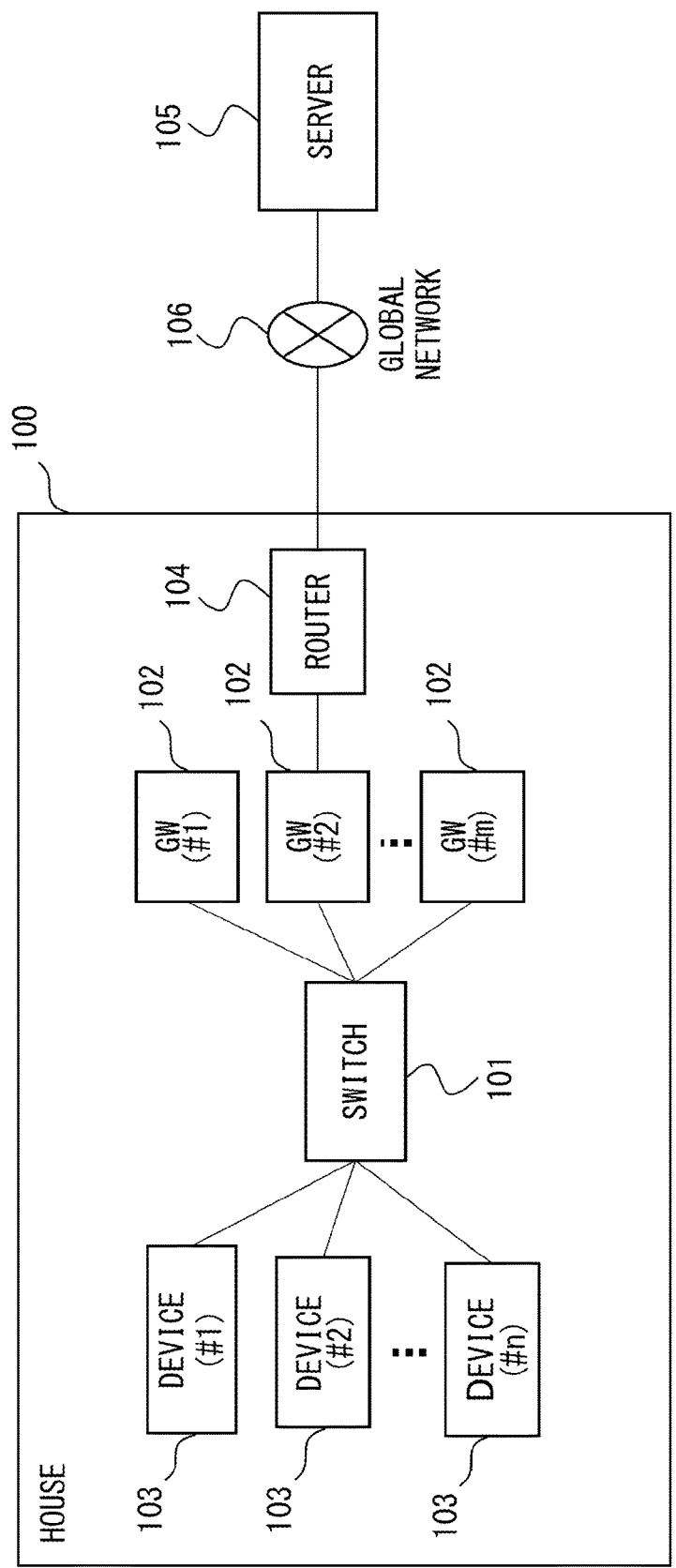
FIG. 1 illustrates an example of a device management system according to the present embodiment.

FIG. 1 illustrates an example of a device management system according to the present embodiment. n devices (management target devices) 103 (device(#1) through (#n) where n is an arbitrary integer greater than or equal to one) such as a sensor device, a home appliance, etc. provided in a house 100 such as a residence, a building, etc. are connected to a switch 101. Also, m GWs (device management apparatuses) 102 (GWs (#1) through (#m) where m is an arbitrary integer greater than or equal to one) are connected to the switch 101. In this example, GW 102 (#2) is connected to a global network 106 such as the Internet via a router 104. A server 105 is connected to the global network 106.

GW 102(#2) communicates with arbitrary one or more of the devices (management target devices) 103(#1) through 103(#n) via the switch 101 in response to a request from a service of application software that is executed in the server 105 in the global network 106. Other GWs 102 may communicate with arbitrary one or more of the devices 103(#1) through 103 (#n) via the switch 101 in response to a request from services of application software installed in the GWs 102 themselves.

In the present embodiment, when the GWs 102 request to obtain property values (attribute information) managed by the devices 103, the cache value of each of the devices 103 cached in the switch 101 and cache value of each of the property values of the devices 103 cached in the switch 101 are returned as a proxy response instead of inquiring of the devices 103, and thereby it is possible to reduce communications to the devices 103. In such a case, when each property value is kept cached in the switch 101 for a long time, changes in each property value in the device 103 are left without being reflected for a long time, affecting services that need short-term update. When, in contrast, a period of time over which each property value is kept cached is short, the frequency of accesses to the device 103 increases. In other words, when the number of packets transmitted to the device 103 are reduced by using a conventional cache technique, it is not possible to obtain real-time data. Thus, in the present embodiment, control is conducted to determine whether to return cache data or to inquire of the device 103, based on the cache value allowable time registered in the switch 101 in advance for each of the GWs 102.

Accordingly, it is possible to minimize inquiries to the device 103 by reducing the number of requests for obtaining property values of the same device 103 and by reducing the number of packets reaching the device 103. In addition, it is also possible to return the latest data allowed by the GW 102 as a proxy response from the switch 101 to the GW 102.

According to the present embodiment, as a result of reducing inquiries to the device 103 in the above manner, the necessity of providing the devices 103 with reception buffers of large capacity is eliminated, making it possible to reduce the consumption of resources such as reception buffers, etc.

Further, it is possible to reduce the number of packets discarded due to buffer overflows. The present embodiment also makes it possible to reduce processing loads such as loads of response processing etc. conducted by the devices 103 in response to obtaining requests. Further, according to the present embodiment, it is possible, through a cache mechanism provided to the switch 101, to obtain real-time data in response to requests from services conducted in the GWs 102 or in a server to which the GWs 102 are connected.

Figure 2:
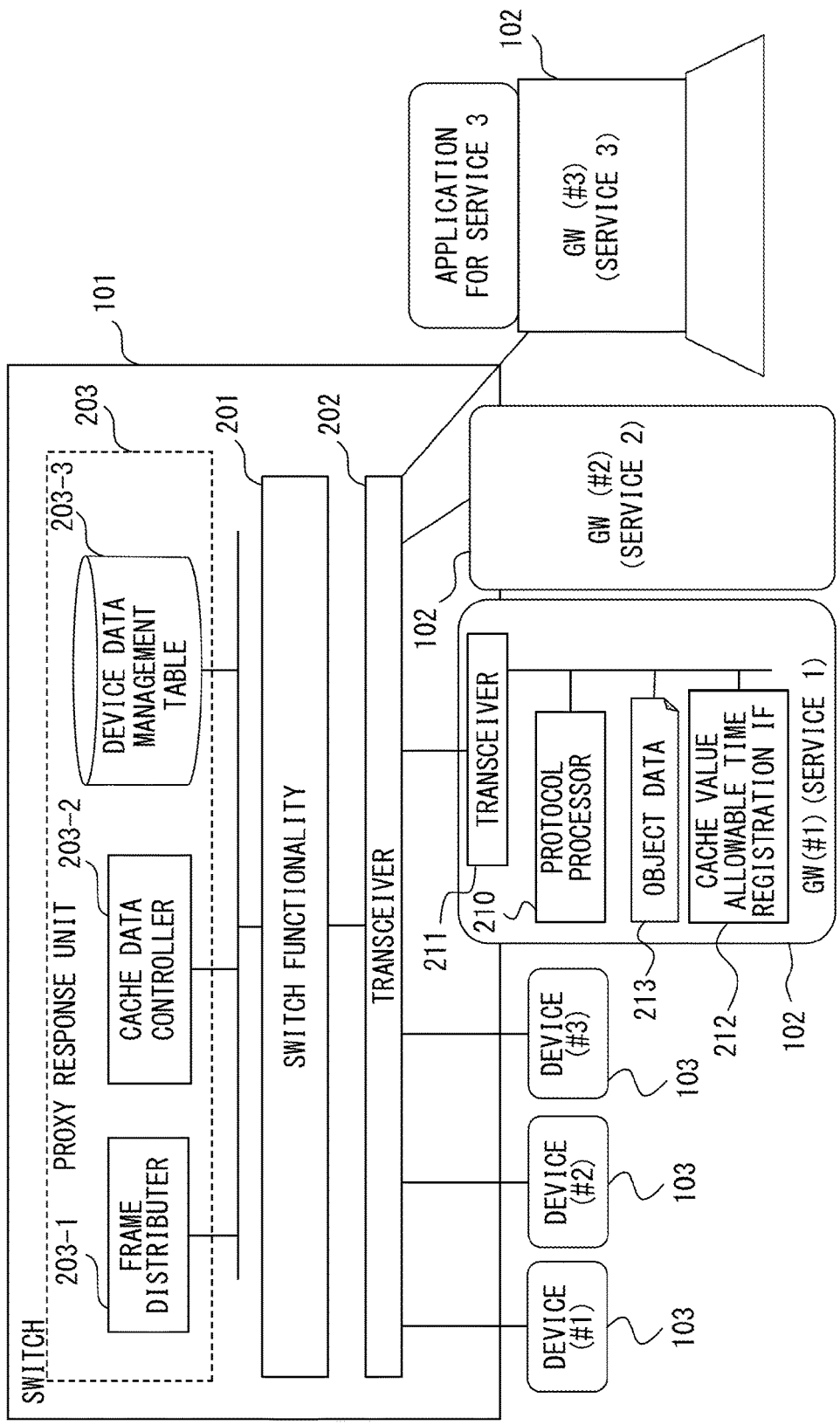
FIG. 2 is a block diagram illustrating a functional configuration example of a switch and a GW.

FIG. 2 is a block diagram illustrating a functional configuration example of the switch 101 and the GW 102 illustrated in FIG. 1.

The switch 101 includes switch functionality 201, a transceiver 202 and a proxy response unit 203.

The transceiver 202 is connected to each of the GWs 102 illustrated in FIG. 1 (#1 through #3 in FIG. 2) and the devices 103 illustrated in FIG. 1 (#1 through #3 illustrated in FIG. 2) via port (not illustrated), and frame data is transmitted or received between the transceiver 202 and each of the GWs 102 or the devices 103.

The switch functionality 201 forwards a frame data received via an arbitrary port in the transceiver 202 to a corresponding port serving as the destination in accordance with the destination MAC (Media Access Control) address set in the received frame data.

The proxy response unit 203 includes a frame distributer 203-1, a cache data controller 203-2 and a device data management table 203-3.

The frame distributer 203-1 monitors frame data forwarded by the switch functionality 201. The frame distributer 203-1 guides, to the cache data controller 203-2, frame data based on a communication protocol adopted between the GWs 102 and the devices 103. A communication protocol adopted between the GWs 102 and the devices 103 is for example ECHONET Lite standardized internationally as an International Standardization Organization (ISO) standard and as an International Electrotechnical Commission (IEC) standard. ECHONET Lite is a communication protocol in which the GWs 102 conduct data collection or control on the devices 103 using a message (see FIG. 6 which will be described later) called an ECHONET Lite frame.

An attribute information storage such as the device data management table 203-3 stores information containing a property (attribute information) of the device 103 and the reception time of that property. More specifically, the device data management table 203-3 has an entry for each of the devices 103 or the GWs 102, and a property and the reception time of that property are registered for each entry. A property is a set of a property name defined for each of the devices 103 and the value of the property. Detailed explanations of this will be given in the explanation for the device data management table 203-3 illustrated in FIG. 4.

Receiving a property from the device 103, an attribute information response controller such as for example the cache data controller 203-2 stores the property and the reception time thereof in the device data management table 203-3. Also, receiving a property value obtaining request from the GW 102, the cache data controller 203-2 conducts the following operations. The cache data controller 203-2 executes either a process of returning to the GW 102 a property value stored by the device data management table 203-3 as a proxy response to the property value obtaining request or a process of obtaining the property value corresponding to the property value obtaining request from the device 103 and returning it to the GW 102 as a proxy response. Which of the processes is to be executed is determined based on whether or not the device data management table 203-3 stores the property value corresponding to the property value obtaining request and based on the difference between the reception time of the property value obtaining request and the reception time of corresponding property value stored by the device data management table 203-3. Other operations of the cache data controller 203-2 will be described in the detailed explanations of the cache data controller 203-2 by referring to the flowcharts illustrated in FIG. 7 through FIG. 10.

As illustrated in FIG. 2, the GWs 102 include ECHONET Lite protocol process units ("protocol processor" 210 in FIG. 2). Also, the GWs 102 include transceivers 211 and cache value allowable time registration interfaces ("cache value allowable time registration IF" in FIG. 2) 212. Further, the GWs 102 include ECHONET Lite object data management tables 213 ("object data" in FIG. 2).

The transceiver 211 conducts transmission and reception of frame data with the transceiver 202 in the switch 101.

Based on an ECHONET Lite communication protocol, the ECHONET Lite protocol processor 210 executes a reception process of an ECHONET Lite frame received by the transceiver 211 and executes a report process of the ECHONET Lite object data management table 213. When for example the value of a cache value allowable time property is updated in the ECHONET Lite object data management table 213, the ECHONET Lite protocol processor 210 multicasts a status report message for reporting that update via the transceiver 211.

A cache value allowable time is data used for determining the time difference between a reception time of a property value obtaining request and a reception time of the property value of an entry concerning the request in a case when the cache data controller 203-2 in the switch 101 has received a property value obtaining request from the GW 102 and the corresponding property value is stored in the entry in the device data management table 203-3. A cache value allowable time is reported by a status report message described above to the switch 101, and is stored in an entry in the device data management table 203-3. When the above time difference is shorter than the cache value allowable time of the corresponding GW 102, the cache data controller 203-2 in the switch 101 returns the property value stored in the entry to the above GW 102 as a proxy response. When the above time difference is longer than the cache value allowable time of the corresponding GW 102, the cache data controller 203-2 obtains a new property value from the device 103 corresponding to the property value obtaining request, and returns it to the GW 102 as a proxy response.

As described above, according to the present embodiment, control is conducted to determine whether or not to inquire of the device 103 about whether or not to return cache data, based on the cache value allowable time for each of the GWs 102 registered in the switch 101 in advance. Thereby, it is possible to return the latest data within a time range allowed by the GW 102 as cache data from the switch 101 to the GW 102 as a proxy response without inquiring of the device 103.

In FIG. 2, the ECHONET Lite object data management table 213 in the GW 102 stores data of the object of the GW 102 as a controller object in an ECHONET Lite communication protocol. More specifically, the ECHONET Lite object data management table 213 stores a cache value allowable time property as an individual property.

The cache value allowable time registration interface 212 is used by an administrator of the GW 102, a service of an upper layer system of the GW 102, etc. to register a value as a cache value allowable time property in the ECHONET Lite object data management table 213

In FIG. 2, for example the GW 102(#1) or 102 (#3) collects data from at least arbitrary one of the devices 103(#1)-103(#3) via the switch 101 in response to a request from a service 1 or service 3 of application software provided to that GW 102 itself. Also, the GW 102 (#2) collects data from at least arbitrary one of the devices 103(#1)-103 (#3) via the switch 101 in response to a request form a service 2 of application software executed in the server 105 in the global network 106 illustrated in FIG. 1.

FIG. 3A illustrates a hardware configuration example of the switch 101 illustrated in FIG. 1 or FIG. 2. The switch 101 includes a CPU (Central Processing Unit) 301, a memory 302, a storage 303, a frame transfer engine 304, a plurality of LAN (Local Area Network) interface units 305, a system bus 306 and a communication bus 307. The CPU 301, the memory 302, the storage 303 and the frame transfer engine 304 are connected to each other through the system bus 306. The frame transfer engine 304 and the plurality of LAN interface units 305 are connected to each other through the communication bus 307.

The CPU 301 executes a control program that was read from the storage 303 to the memory 302, and thereby conducts operations corresponding to the frame distributer 203-1 and the cache data controller 203-2 illustrated in FIG. 2.

The LAN interface units 305 correspond to respective port (not illustrated) in the transceiver 202 illustrated in FIG. 2, and terminate frame data transmitted in the LAN that connects the transceiver 202 and the transceiver 211 illustrated in FIG. 2.

The frame transfer engine 304 is hardware that conducts the operations corresponding to the switch functionality 201 illustrated in FIG. 2. The frame transfer engine 304 stores, for each of the LAN interface units 305, a MAC address of the device 103 or the GW 102 illustrated in FIG. 1 or FIG. 2 connected to the LAN interface unit 305 as a destination address. Then, the frame transfer engine 304 forwards a frame data received by the LAN interface unit 305 to another LAN interface unit 305 corresponding to the destination MAC address of the frame data.

In addition to the control program executed by the above CPU 301, the storage 303 stores data of the device data management table 203-3 illustrated in FIG. 2 etc.

The present embodiment is realized by the CPU 301 executing a control program that is provided with the functions implemented by the flowcharts illustrated in FIG. 7 through FIG. 10 (which will be described later) etc. That control program may be stored in the storage 303 or may also be obtained by the LAN interface unit 305 from a network.

FIG. 3B illustrates a hardware configuration example of the GWs 102 illustrated in FIG. 1 or FIG. 2. The GW 102 has a configuration in which a CPU 311, a memory 312, a storage 313, a LAN interface unit 314, a different-system interface unit 315 and a user interface unit 316 are connected to each other through a bus 317.

The CPU 311 executes a control program that is read from the storage 313 to the memory 312, and thereby conducts the operations corresponding to the protocol processor 210 and the cache value allowable time registration interface 212 illustrated in FIG. 2.

The LAN interface unit 314 corresponds to the transceiver 211 illustrated in FIG. 2, and terminates frame data transmitted in the LAN that connects the transceiver 202 and the transceiver 211 illustrated in FIG. 2.

The different-system interface unit 315 terminates data that is transmitted in the global network 106 via the router 104 illustrated in FIG. 1. The user interface unit 316 is hardware that executes the operation of the cache value allowable time registration interface 212 illustrated in FIG. 2 in cooperation with the CPU 311.

In addition to the control program executed by the above CPU 311, the storage 313 stores data of the ECHONET Lite object data management table 213 illustrated in FIG. 2 etc.

FIG. 4 illustrates a data configuration example of the device data management table 203-3 illustrated in FIG. 2. The device data management table 203-3 includes an entry for each of the devices 103 or the GWs 102 connected to the switch 101. This entry has the items for "device type", "MAC address", "IP address", "EOJ", "property name", "value" and "date and time of update".

As an item for "device type", the type of the device 103 or the GW 102 corresponding to the entry is registered. In a case where the respective entries correspond to the devices 103(#1) or 103(#2) illustrated in FIG. 1 or FIG. 2, "device (#1)", "device (#2)", . . . , etc. are registered in the items for "device type". In a case where the respective entries correspond to the GWs 102(#1)-102(#3) illustrated in FIG. 1 or FIG. 2, "controller (#1)", "controller (#2)", "controller (#3)", etc. are registered as the items for "device type".

As an item for "MAC address" and "IP address", the MAC address and the IP address of the device 103 or the GW 102 corresponding to the entry are registered.

As an item for "EOJ", the ECHONET Lite object identifier of the device 103 or the GW 102 corresponding to the entry is registered as a value in hexadecimal notation. "0x" in the items for "EOJ" in FIG. 4 represents that the following values are in hexadecimal notation.

As an item for "property name", the name of at least one property item managed by the device 103 is registered when the entry corresponds to that device 103. As an item for "value", the value of corresponding item for "property name" is registered. In FIG. 4, for device 103(#1), "operation status=ON", "set temperature (target temperature)=26 degrees", "temperature (current temperature)=28 degrees" and "timer setting=ON" are registered with respect to "property name=value". This is an example in a case where device 103 (#1) is a sensor. For device 103(#2), "operation status=ON", . . . , "CPU usage rate=15%", "operating time=8 h", "accumulated number of errors=52" and "memory remaining capacity=1.2 GB" are registered. This is an example in a case where device 103(#2) is a computer.

Also, as an item for "date and time of update", the reception time from the device 103 of "value" for corresponding item for "property name" is registered.

Further, as an item for "property name", "cache value allowable time", which is a name managed by the GW 102, is registered, and as an item for "value", the time value of the actual cache value allowable time reported by the GW 102 is registered when the entry corresponds to the GW 102. In FIG. 4, "cache value allowable time=5 seconds" is registered for controller (#1) (GW102(#1)). For controller (#2) (GW102(#2)), "cache value allowable time=60 seconds" is registered. For controller (#3) (GW102(#3)), "cache value allowable time=1 second" is registered.

FIG. 5 illustrates a data configuration example of the ECHONET Lite object data management table 213 stored by the GW 102 illustrated in FIG. 2, The entry of this table stores a property as an ECHONET Lite object of the GW 102. This table has indispensable properties and individual properties such as "device type=controller", "EOJ=identifier of the GW 102", "operation status=ON or OFF", "production code=a code number assigned by the production company", etc. Also, this table stores a cache value allowable time.

FIG. 6 illustrates a configuration example of an Ethernet frame data storing an ECHONET Lite frame based on an ECHONET Lite communication protocol transmitted between the GWs 102, the switch 101 and the devices 103 illustrated in FIG. 1 or FIG. 2.

A source MAC address 601 and a destination MAC address 602 configure the header of an Ethernet frame. The source MAC address 601 is the MAC address of the device (the switch 101, the GW 102 or the device 103) that transmitted the Ethernet frame. The destination MAC address 602 is the MAC address of the device that is the destination of the Ethernet frame.

A source IP address 603 and a destination IP address 604 configure the header of an IP (Internet Protocol) packet stored in an Ethernet frame. The source IP address 603 is the IP address of the device that transmitted the IP packet. The destination IP address 604 is the IP address of the device that is the destination of the IP packet.

A source port number 605 and a destination port number 606 configure the header of the TCP (Transmission Control Protocol) segment stored in an IP packet. The source port number 605 is the port number (corresponding to a service) of the device that transmitted the TCP segment. The destination port number 606 is the port number (corresponding to a service) of the device that is the destination of the TCP segment.

An ECHONET Lite frame 607 is a property that is stored in the data portion of a TCP segment so as to be transmitted between the switch 101, the GWs 102 and the devices 103 in accordance with an ECHONET Lite communication protocol.

The ECHONET Lite frame 607 includes respective pieces of data of "TID", "SEOJ", "DEOJ", "ESV" and "OPC" that follow the header "EHD" (not illustrated). Further, an ECHONET Lite frame further includes property values of ("EPC1", "PDC1", "EDT1") through ("EPCn", "PDCn", "EDTn").

"TID" is a transaction identifier. TID will be described later.

"SEOJ" is the identifier of a source ECHONET Lite object and "DEOJ" is the identifier of a destination ECHONET Lite object. These identifiers are used for identifying a source device or a destination device and also represent the types of the devices.

"ESV" is a service value that specifies an access rule of ECHONET Lite, and the value of "0x6X" indicates that the ECHONET Lite frame thereof is a property value obtaining request message. Note that "0x" represents that "6X" is in hexadecimal notation and "X" represents an arbitrary value in hexadecimal notation. When the above value is "0x5X" or "0x7X", it is indicated that the ECHONET Lite frame thereof is a response message.

In "OPC", the number of process properties (n) is stored. In ("EPC1", "PDC1", "EDT1") through ("EPCn", "PDCn", "EDTn"), a combination of property values having the numbers of process properties that correspond to "n" above, "EPC" represents the access target property and "EDT" represents the property value data. "PDC" represents the number of bytes of "EDT".

Figure 7:
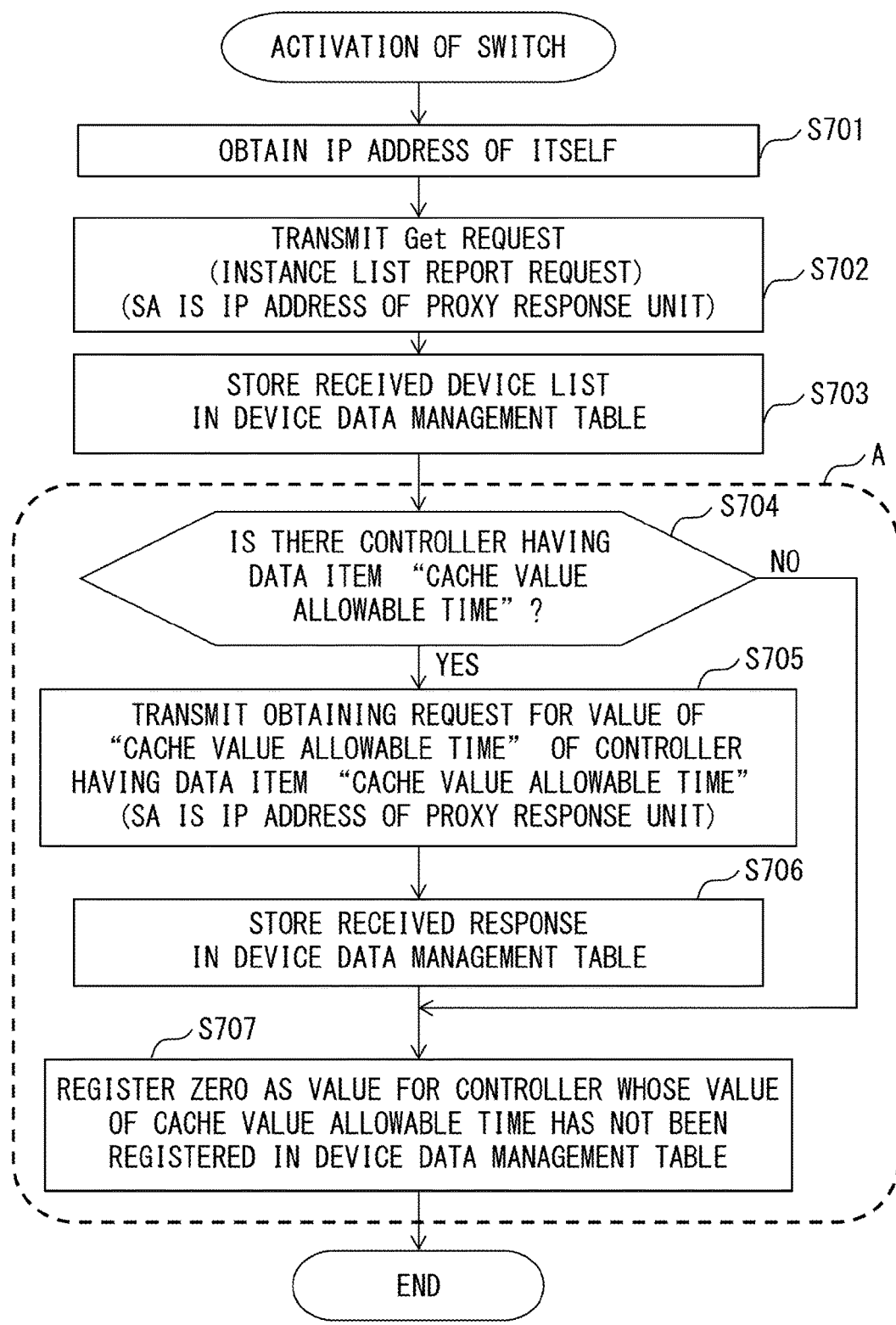
FIG. 7 is a flowchart illustrating an example of a proxy response process executed when the switch is activated.

FIG. 7 is a flowchart illustrating an example of a proxy response process executed when the switch 101 is activated. This process is a process in which the CPU 301 executes a switch activation process program that has been read by the CPU 301 from the storage 303 to the memory 302 in a hardware configuration example illustrated in FIG. 3A. This process is part of the operations of the proxy response unit 203 illustrated in FIG. 2.

The switch 101 obtains the IP address of itself. Specifically, the CPU 301 in the switch 101 inquires of a DHCP (Dynamic Host Configuration Protocol) server (not illustrated) such as for example the router 104 illustrated in FIG. 1 by using an IP address automatic obtaining technique that is known as a DHCP etc. Thereby, the CPU 301 obtains the IP address for the switch 101 of the CPU 301 and sets the address in for example the memory 302 (step S701).

The switch 101 multicasts an instance list request message to all the devices 103 and GWs 102 connected to the switch 101. Specifically, the CPU 301 in the switch 101 multicasts frame data storing an instance list request message as a Get request message, which is a request message based on an ECHONET Lite communication protocol. The frame transfer engine 304 illustrated in FIG. 3A forwards, to each of the LAN interface units 305, frame data whose destination MAC address 602 indicates multicast transmission, and transmits the data (step S702). In such a case, the instance list request message is stored in the ECHONET Lite frame 607 in the frame data to be transmitted illustrated in FIG. 6. In the source MAC address 601, the MAC address of each of the LAN interface units 305 is stored. In the destination MAC address 602, the MAC address for multicast transmission is stored. In the source IP address 603 (referred to as "SA" in step S702), the IP address of the switch 101 itself (proxy response unit 203) obtained in step S701 is stored. In the destination IP address 604, the IP address for multicast transmission is stored. In the source port number 605 and the destination port number 606, port numbers that have been assigned to the ECHONET Lite communication protocol are stored, respectively.

Next, the CPU 301 in the switch 101 registers, in the device data management table 203-3 (FIG. 2), a device list of the devices 103 and the GWs 102 (FIG. 1) that responded to the above instance list request message (step S703). Specifically, the CPU 301 receives, via the respective LAN interface units 305 and the frame transfer engine 304 illustrated in FIG. 3A, an instance list response message from each of the devices 103 and the GWs 102 (FIG. 1) that responded to the instance list request message. In such a case, in the received frame data illustrated in FIG. 6, the instance list response message is stored in the ECHONET Lite frame 607. In the source MAC address 601 and the source IP address 603, the MAC address and the IP address of the device 103 or the GW 102 that is the response source are stored. Also, as the item for "SEOJ" in the ECHONET Lite frame 607, the ECHONET Lite object identifier of the device 103 or the GW 102 that is the response source is stored. The CPU 301 registers, in the device data management table 203-3 (see FIG. 2) in the memory 302 or the storage 303, the source MAC address 601, the source IP address 603 and the item value of "SEOJ". More specifically, the CPU 301 generates a new entry of a data configuration example illustrated in FIG. 4 in the device data management table 203-3. Then, the CPU 301 registers the source MAC address 601, the source IP address 603 and the item value of "SEOJ" as the item for "MAC address", the item for "IP address" and the item for "EOJ" of the entry. Also, the CPU 301 registers the device type name defined by the item for "EOJ" as the item for "device type" in the new entry in the device data management table 203-3 illustrated in FIG. 4. Also, the CPU 301 registers the property name set in the instance list response message as the item for "property name" in the new entry. This property name is reported as values of "EPC1" through "EPCn" etc. in the received frame data illustrated in FIG. 6.

Next, the switch 101 executes cache value allowable time registration process A, which is enclosed by the dashed line in FIG. 7.

First, the CPU 301 in the switch 101 decides whether or not there is a device whose type is "controller" and whose property name includes "cache value allowable time" (step S704).

When the decision result is YES in step S704, the CPU 301 in the switch 101 transmits a cache value allowable time request message to the response-source GW 102 that is detected in step S704 (step S705). In such a case, in the transmitted frame data of the data illustrated in FIG. 6, the cache value allowable time request message is stored in the ECHONET Lite frame 607. In the source MAC address 601 (referred to as "SA" in step S705), the MAC address of each of the LAN interface units 305 is stored. In the destination MAC address 602, the source MAC address 601 that was set in the received frame data causing the decision to be YES in step S704 is stored. In the source IP address 603, the IP address of the switch 101 itself (the proxy response unit 203 illustrated in FIG. 2) obtained in step S701 is stored. In the destination IP address 604, the source IP address 603 that was set in the received frame data causing the decision to be YES in step S704 is stored. In the source port number 605 and the destination port number 606, port numbers that have been assigned to the ECHONET Lite communication protocol are stored, respectively.

Next, the switch 101 registers, in the device data management table 203-3, a cache value allowable time included in the cache value allowable time response message from the GW 102 (FIG. 1) that responded to the above cache value allowable time request message. Specifically, the CPU 301 in the switch 101 receives a cache value allowable time response message via one of the LAN interface units 305 and the frame transfer engine 304 illustrated in FIG. 3A. In such a case, a cache value allowable time response message is stored in the ECHONET Lite frame 607 illustrated in FIG. 6. In the source MAC address 601 and the source IP address 603, the MAC address and the IP address of the GW 102 that is the response source are stored. Also, as the item for "SEOJ" in the ECHONET Lite frame 607, the ECHONET Lite object identifier of the GW 102 that is the response source is stored. Also, as the "EPC1" item in the ECHONET Lite frame 607, the name of "cache value allowable time" is stored and as the item for "EDT1", the cache value allowable time value is stored. As the item for "RDC1", the number of the bytes of the item value of "EDT1" is stored. The CPU 301 extracts the entry of the type of "controller" in which the source MAC address 601, the source IP address 603 or the item value of "SEOJ" are stored in the device data management table 203-3 of the data configuration example illustrated in FIG. 4. Then, the CPU 301 registers the cache value allowable time value of the above item for "EDT1" as the item for "value" that corresponds to "property name=cache value allowable time" in that entry (step S706).

The CPU 301 skips the processes in steps S705 and S706 described above when the decision result in step S704 is NO.

Thereafter, in the registration process in step S703, the CPU 301 in the switch 101 executes the following process on a device whose type is "controller" and whose property name does not include "cache value allowable time". The CPU 301 registers "0" as the item for "value" that corresponds to "property name=cache value allowable time" in an entry that satisfies the above conditions in the device data management table 203-3 of the data configuration example illustrated in FIG. 4 (step S707).

Figure 8:
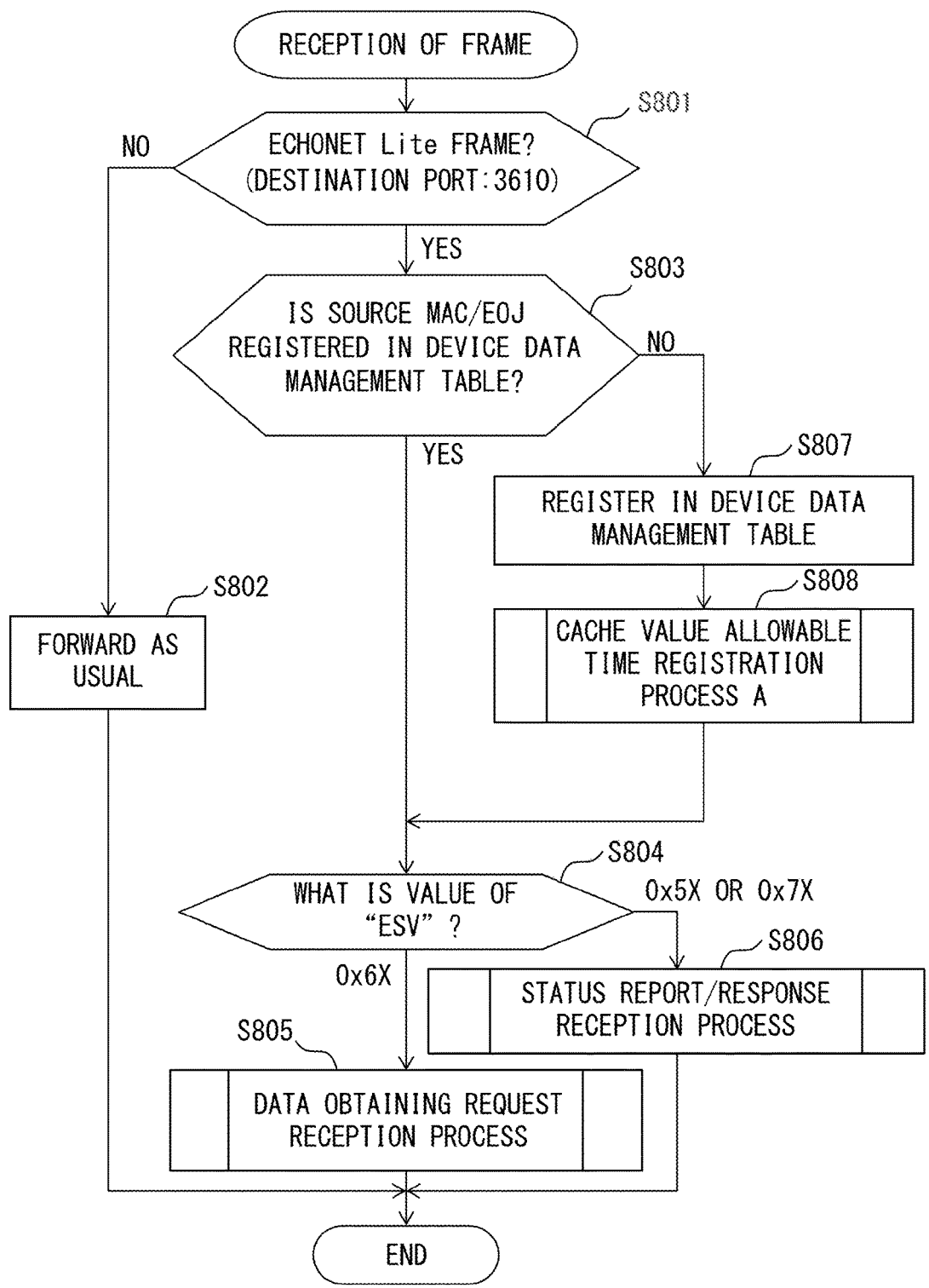
FIG. 8 is a flowchart illustrating an example of a proxy response process when the switch receives a frame.

FIG. 8 is a flowchart illustrating an example of a proxy response process when the switch 101 receives a frame. The CPU 301 loads a frame reception process program from the storage 303 to the memory 302 based on a frame reception report from the frame transfer engine 304 illustrated in FIG. 3A. This process is part of the operations of the proxy response unit 203 illustrated in FIG. 2.

The CPU 301 in the switch 101 decides whether or not frame data received by the frame transfer engine 304 from one of the LAN interface units 305 illustrated in FIG. 3A is an ECHONET Lite frame (step S801). Specifically, the CPU 301 decides whether or not the destination port number 606 in the frame data of the data illustrated in FIG. 6 reported by the frame transfer engine 304 is storing the port number value "3610" that corresponds to an ECHONET Lite communication protocol.

When the decision result is NO in step S801, the CPU 301 instructs the frame transfer engine 304 to forward the received frame data as usual (step S802), and the frame reception process program of the flowchart illustrated in FIG. 8 is terminated. Thereby, in accordance with the destination MAC address 602 of the frame data received by one of the LAN interface units 305, the frame transfer engine 304 forwards the above frame data to the LAN interface unit 305 corresponding to the MAC address.

When the decision result is YES in step S801, the CPU 301 does not make the frame transfer engine 304 execute the transfer process of the received frame data but executes the proxy response process represented as a series of processes in steps S803-S806.

The CPU 301 executes the following decision about the received frame data of the data illustrated in FIG. 6 (step S803). The CPU 301 decides whether or not the source MAC address 601 and the item value of "SEOJ" in the ECHONET Lite frame 607 in the frame data have been registered in one of the entries in the device data management table 203-3 (step S803). In other words, the CPU 301 decides whether or not the source MAC address 601 and item value of "SEOJ" are respectively registered as the items for "MAC address" and "EOJ" in one of the entries in the device data management table 203-3 of the data illustrated in FIG. 4.

When the decision result is YES in step S803, the CPU 301 detects the item value of "ESV" in the ECHONET Lite frame 607 in the received frame data (step S804).

When "ESV=0x6X" in step S804, the CPU 301 decides that the ECHONET Lite frame 607 in the received frame data is a data obtaining request message. In such a case, the CPU 301 executes the data obtaining request reception process (step S805), which will be described later.

When "ESV=0x5X" or "ESV=0x7X" in step S804, the CPU 301 decides that the ECHONET Lite frame 607 in the received frame data is a status report or a response message. In such a case, the CPU 301 executes the status report/response reception process (step S806), which will be described later.

After the above process in step S805 or S806, the CPU 301 terminates the frame reception process program of the flowchart illustrated in FIG. 8.

When the decision result is NO in step S803, the CPU 301 in the switch 101 registers, in the device data management table 203-3 (FIG. 2), the device 103 or the GW 102 (FIG. 1) that transmitted the received frame data (step S807). Specifically, the CPU 301 extracts the source MAC address 601, the source IP address 603 and the item value of "SEOJ" from the received frame data illustrated in FIG. 6. Next, the CPU 301 generates a new entry having a data configuration as exemplified in FIG. 4 in the device data management table 203-3 (see FIG. 2) in the memory 302 or the storage 303. Then, the CPU 301 registers the source MAC address 601, the source IP address 603 and the item value of "SEOJ" as the item for "MAC address", the item for "IP address" and the item for "EOJ", respectively. Also, the CPU 301 registers a device type name defined by the item for "EOJ" as the item for "device type" in the above new entry in the device data management table 203-3 illustrated in FIG. 4. Also, the CPU 301 registers the property name set in the instance list response message as the item for "property name" in the above new entry. This property name is reported as a value of "EPC1" through "EPCn", etc. in the received frame data illustrated in FIG. 6.

Next, the CPU 301 in the switch 101 executes cache value allowable time registration process A, which is enclosed by the dashed line in FIG. 7 (step S808). Thereby, when there is a device whose type is "controller" and whose property name includes "cache value allowable time" in the registration process in step S807, the CPU 301 inquires, about the cache value allowable time, of the GW 102 that transmitted the received frame data. Then, the CPU 301 registers the cache value allowable time returned from the GW 102 in the entry generated in the registration process in step S807 in the device data management table 203-3.

Thereafter, the CPU 301 executes a series of the above processes in steps S804-S806.

Figure 9:
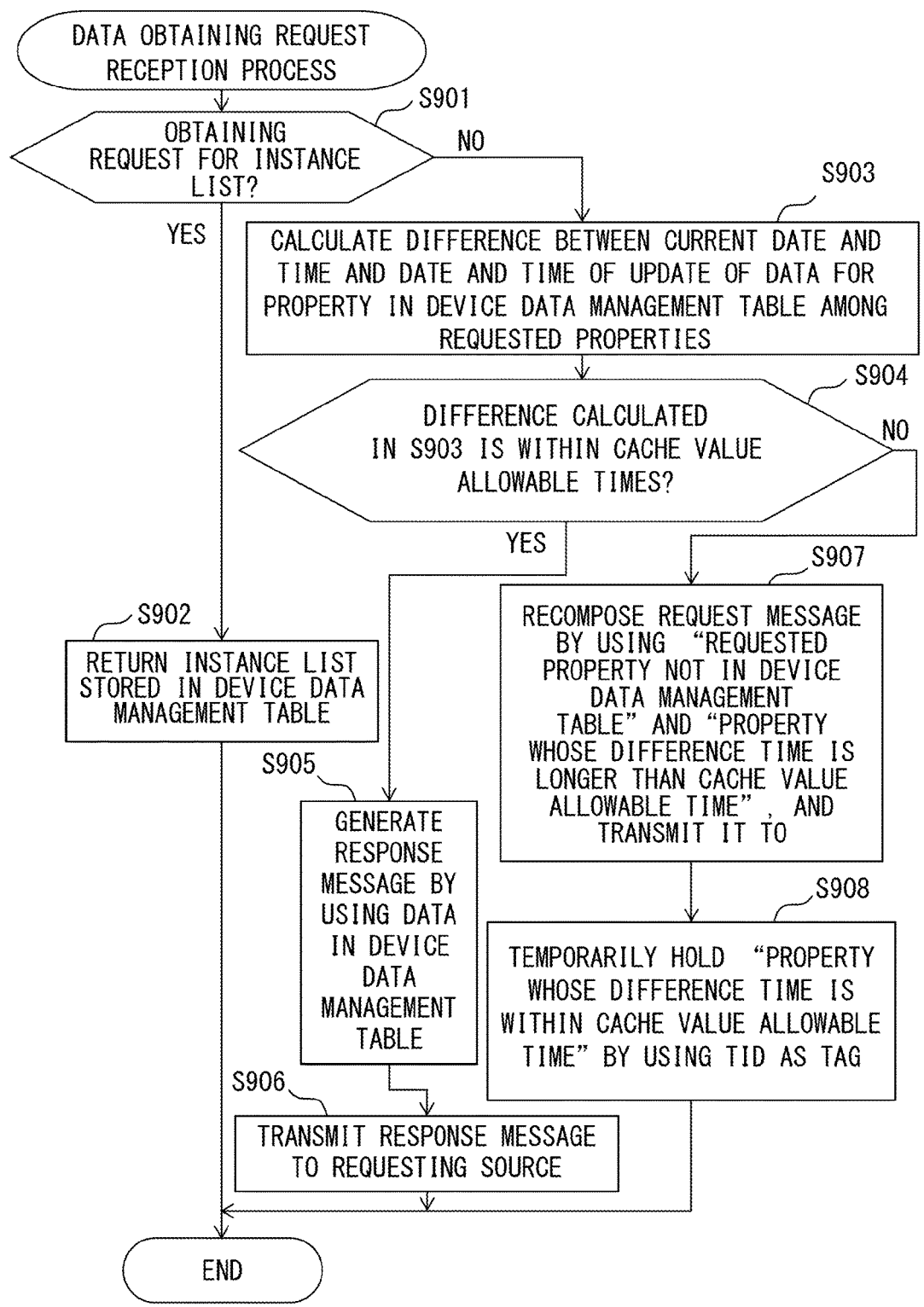
FIG. 9 is a flowchart illustrating a detailed process executed by the switch when a data obtaining request is received.

FIG. 9 is a flowchart illustrating the data obtaining request reception process in step S805 in FIG. 8.

The CPU 301 decides whether or not the ECHONET Lite frame 607 of the frame data received via the frame transfer engine 304 is an instance list obtaining request message (step S901).

When the decision result is YES in step S901, the CPU 301 generates a list of instances registered in respective entries in the device data management table 203-3 illustrated in FIG. 4, and returns the list to the source of the instance light obtaining request message (step S902). Specifically, the CPU 301 generates an instance list obtaining response message for each of the above entries. In such a case, the MAC address of the LAN interface unit 305 itself through which the returned frame data is output is stored in the source MAC address 601 in FIG. 6. The source MAC address 601, which has been set in the received frame data at the activation of the frame reception process program corresponding to the flowchart illustrated in FIG. 8, is stored in the destination MAC address 602. In the source IP address 603, the IP address registered as the item for "IP address" (see FIG. 4) in the process-target entry is stored. In other words, the switch 101 is to return the IP address by proxy for the device of the process-target entry. In the destination IP address 604, the source IP address 603, which has been set in the above received frame data, is stored. In the source port number 605 and destination port number 606, the port numbers corresponding to the ECHONET Lite communication protocol are stored. As the item for "SEOJ" in the ECHONET Lite frame 607, the object identifier registered as the item for "EOJ" (see FIG. 4) of the process-target entry is stored. In that case as well, the switch 101 is to return the EOJ value as by proxy for the device in the process-target entry. As the item for "ESV" in the ECHONET Lite frame 607, a value representing a response is stored. In the combinations of property values ("EPC1", "PDC1", "EDT1") through ("EPCn", "PDCn", "EDTn") in the ECHONET Lite frame 607, a combination of the item for "property name" and the item for "value" in the process-target entry is stored. In that case, the item for "property name" and the item for "value" are stored in "EPC1" through "EPCn" and "EDT1" through "EDTn", respectively. In "PDC1" through "PDCn", the numbers of bytes respectively of "EDT1" through "EDTn" are stored. As the item for "OPC" in the ECHONET Lite frame 607, the number of the combinations of the item for "property name" and the item for "value" in the process-target entry is stored as the number of process properties.

After the process in step S902, the CPU 301 terminates the data obtaining request reception process in step S805 in FIG. 8.

As described above, in response to an instance list obtaining request message, the switch 101 can return frame data of respective instance list obtaining response messages as a proxy response for a response from the respective devices 103 or the GWs 102.

When the decision result is NO in step S901, the CPU 301 in the switch 101 decides that the received message is a property value obtaining request message. In such a case, the CPU 301 calculates a difference between the date and time of the update of a property and the current date and time for the property that exists in the device data management table 203-3 among request properties (step S903). Specifically, in "DEOJ" in the ECHONET Lite frame 607 stored in the frame data illustrated in FIG. 6 that corresponds to a property value obtaining request message, the object identifier of the device 103 whose property value is being requested is stored. Also, as the items for "EPC1" through "EPCn" of the ECHONET Lite frame 607, the property names corresponding to requested property values are stored. In each entry in the device data management table 203-3 illustrated in FIG. 4, the object identifier of each device is registered in the item for "EOJ", and the date and time of update at which a value was updated is registered as the item for "date and time of update" for each combination of the item for "property name" and the item for "value". The CPU 301 first identifies an entry in which the value of the item for "DEOJ" in a property value obtaining request message is registered as the item for "EOJ". Then, CPU 301 decides whether or not a value is registered as the item for "value" that corresponds to the item for "property name" in which each property name is registered for each of property names "EPC1" through "EPCn" requested by the property value obtaining request message in that entry. When that value is registered, the CPU 301 calculates a time difference between the date and time of update registered as the item for "date and time of update" that corresponds to the item for "value" in relation to the conducted registration and the current date and time (date and time at which the property value obtaining request message was received).

Next, the CPU 301 in the switch 101 decides whether or not difference time can be calculated in step S903 for each property requested by the above property value obtaining request message and the difference time is within the cache value allowable times (step S904). In this process, the CPU 301 obtains the cache value allowable time in the following manner. The CPU 301 extracts, from the device data management table 203-3, an entry having the type of "controller" that corresponds to the GW 102 that transmitted a property value obtaining request message. Specifically, the CPU 301 extracts an entry in which the item value of "SEOJ" in the ECHONET Lite frame 607 stored in the frame data illustrated in FIG. 6 corresponding to the property value obtaining request message is stored as the item for "EOJ". Then, the CPU 301 obtains the value of the cache value allowable time from the item for "value" that corresponds to "property name=cache value allowable time" in the extracted entry.

When the decision result is YES in step S904, the CPU 301 composes a property value obtaining response message by using the data of the corresponding entry registered in the device data management table 203-3 (step S905).

Specifically, the CPU 301 generates the following data as the ECHONET Lite frame 607 that corresponds to a property value obtaining response message that is to be stored in frame data illustrated in FIG. 6. The CPU 301 obtains, from the entries identified in step S903, the item values of "value" corresponding to the respective items for "property" for which the respective property names "EPC1" through "EPCn" requested by the property value obtaining request message are registered. Then, the CPU 301 generates combinations of property names ("EPC1", "PDC1", "EDT1") through ("EPCn", "PDCn", "EDTn") for which "EDT1" through "EDTn" were set as the item values of "value". Note that the CPU 301 sets "PDC1" through "PDCn" as the numbers respectively of bytes "EDT1" through "EDTn". The CPU 301 sets the number of process properties n as the item value of "OPC". The CPU 301 sets the item value of "EOJ" of the entry identified in step S903 as the item value of "SEOJ". Also, the CPU 301 sets, as the item value of "DEOJ", the item value of "SEOJ" of the ECHONET Lite frame 607 stored in frame data illustrated in FIG. 6 corresponding to the property value obtaining request message. Then, the CPU 301 sets a value representing a response as the item value of "ESV".

When for example a property value obtaining request message requires all the property values of device (#1) in the device data management table 203-3 illustrated in FIG. 4 is employed, the CPU 301 generates the ECHONET Lite frame 607 as follows as a property value obtaining response message.

Combination of Property Values
operation status: "2" "ON"
set temperature: "2" "26"
temperature: "2" "28"
timer setting: "2" "ON"
OPC=4
SEOJ=0x013001
DEOJ=0x05FF01
ESV=0x7

Next, the CPU 301 generates frame data illustrated in FIG. 6 in which the ECHONET Lite frame 607 generated in the above manner is stored. In this process, the CPU 301 sets, as the source MAC address 601, the MAC address of the LAN interface unit 305 illustrated in FIG. 2 that received the frame data of the property value obtaining request message. The CPU 301 sets, as the destination MAC address 602, the source MAC address 601 that was set in the frame data of the property value obtaining request message. The CPU 301 sets, as the source IP address 603, the item value of "IP address" of the entry identified in step S903. The CPU 301 sets, as the destination IP address 604, the source IP address 603 that was set in the frame data of the property value obtaining request message. Also, CPU 301 sets, as the source port number 605 and the destination port number 606, port numbers that correspond to the ECHONET Lite communication protocol.

The switch 101 transmits the above property value obtaining response message to the requesting source. Specifically, the CPU 301 requests that the frame transfer engine 304 illustrated in FIG. 3A transmit a frame data in which the property value obtaining response message composed in step S905 is stored (step S906). The frame transfer engine 304 transmits the frame data concerning the request, via the LAN interface unit 305 in which the destination MAC address 602 of that frame data is stored as the connection destination MAC address.

After the process in step S906, the CPU 301 terminates the data obtaining request reception process in step S805 illustrated in FIG. 8.

When the decision result is NO in step S904, the switch 101 recomposes a property value obtaining request message by using ("requested property not included in the device data management table 203-3" and "property having a difference time that is longer than cache value allowable time"). Then, the switch 101 transmits that request message to the device 103 that is the current request target (step S907). Specifically, the CPU 301 executes the following extraction process in the entry identified in step S903. The CPU 301 extracts a property name that has not been registered as the item for "value" from among the items for "property" for which the respective property names "EPC1" through "EPCn" requested by the property value obtaining request message are registered. Further, the CPU 301 extracts a property name having a difference time, calculated in step S903, that is longer than (not within) the above cache value allowable time. Then, the CPU 301 recomposes a property value obtaining request message in which these extracted property names are set, and transmits the message to the corresponding device 103.

More specifically, the CPU 301 generates the following data as the ECHONET Lite frame 607 that corresponds to a property value obtaining request message to be stored in the data frame illustrated in FIG. 6. The CPU 301 generates a combination "EPC1" through "EPCn" of property values including the respective property names extracted in step S907. The CPU 301 sets the number of process properties n as the item value of "OPC". The CPU 301 sets, as the item value of "DEOJ", the item value of "EOJ" in the entry identified in step S903. Also, the CPU 301 sets, as the item value of "ESV", a value representing a request, such as "ESV=0x5X". Further, the CPU 301 sets, as the item value of "TID", an identification value that was generated uniquely in response to the current property value obtaining request message.

Next, the CPU 301 generates frame data illustrated in FIG. 6 in which the ECHONET Lite frame 607 generated in the above manner is stored. In this process, the CPU 301 sets, as the destination MAC address 602, the item value of "MAC address" of the entry identified in step S903. The CPU 301 sets, as the source MAC address 601, the MAC address of the LAN interface unit 305 itself illustrated in FIG. 3A for which the above destination MAC address 602 is set as the connection destination MAC address. The CPU 301 sets, as the source IP address 603, the IP address of the switch 101 itself that was obtained in step S701 of FIG. 7 and has been stored in the memory 302. The CPU 301 sets, as the destination IP address 604, the item value of "IP address" of the entry identified in step S903. Then, the CPU 301 sets, as the source port number 605 and the destination port number 606, port numbers that correspond to the ECHONET Lite communication protocol.

The CPU 301 requests that the frame transfer engine 304 illustrated in FIG. 3A transmit frame data in which the above property value obtaining request message is stored. The frame transfer engine 304 forwards the frame data concerning the request from via LAN interface unit 305 in which the destination MAC address 602 of that frame data is stored as the connection destination MAC address.

In step S907 above, a property value obtaining request message is transmitted to the device 103 only for a property name that is not registered in an entry in the device data management table 203-3 and for a property name for which the difference time is longer than the cache value allowable time. It is also possible to employ a configuration in which for all property names "EPC1" through "EPCn" requested by a property value obtaining request message, a property value obtaining request message is transmitted to the device 103 and it is requested that all property values be obtained again.

The CPU 301 temporarily stores, in the memory 302 and as a response-waiting property, a property value in the device data management table 203-3 for which the difference time is within the cache value allowable time together with a TID value added in step S907 (step S908). Note that the CPU 301 also stores information of the GW 102 that is the source of the property value obtaining request message (requesting source). As a result of this, it is possible to realize a configuration in which when a property value has been returned from the device 103 in response to the property value obtaining request message transmitted in step S907, that property value and the property value temporarily stored in the memory 302 are associated by TID so as to respond the property values to the request-source GW 102. In other words, the CPU 301 puts together a value of a response-waiting property in the memory 302 to which the same TID value as the TID value added to the received return frame data and the property value in the received return frame data so as to return the values to the requesting source GW 102.

After the process in step S908, the CPU 301 terminates the data obtaining request reception time process in step S805 illustrated in FIG. 8.

Figure 10:
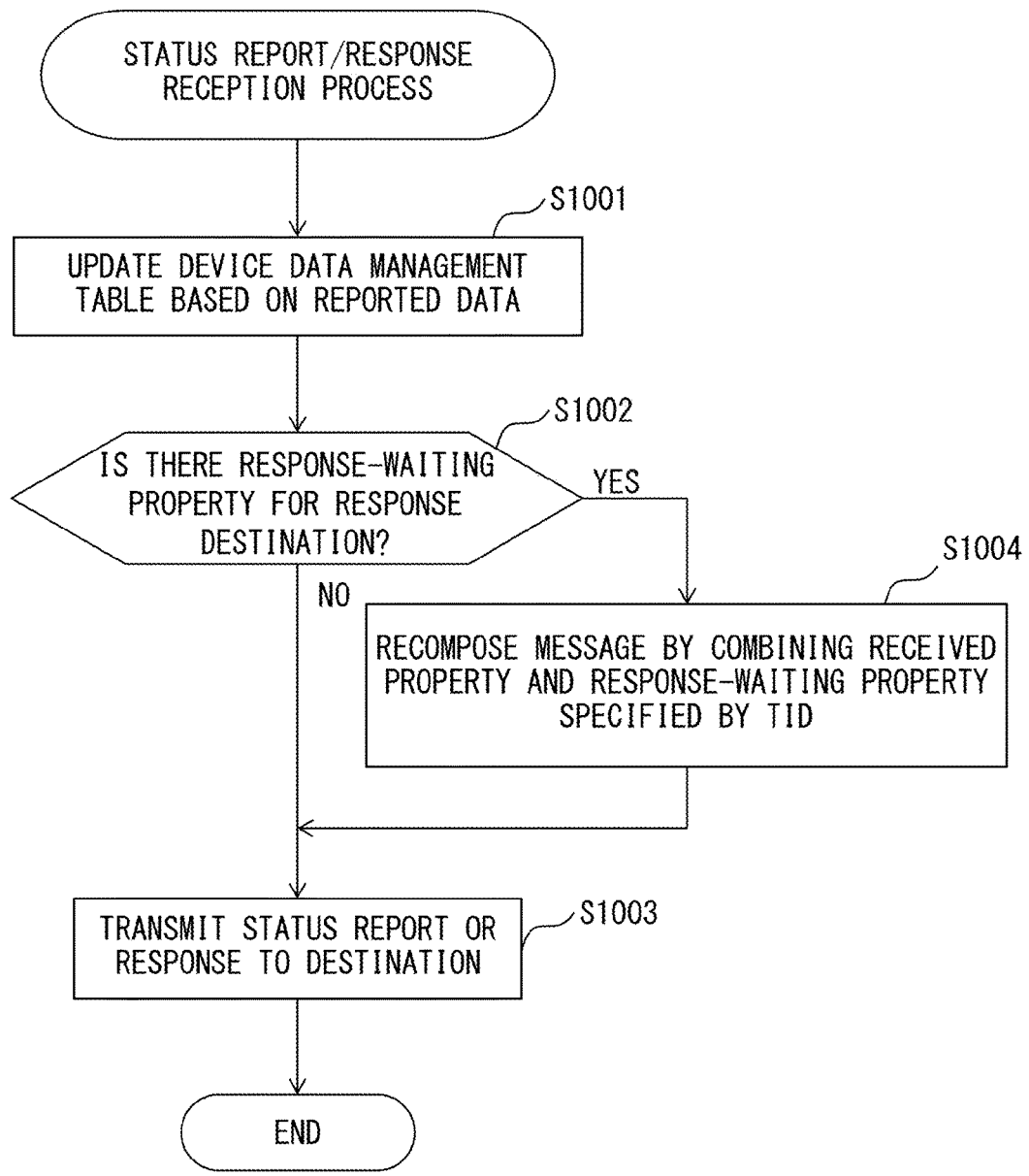
FIG. 10 is a flowchart illustrating a detailed process executed by the switch when the status report/response is received.

FIG. 10 is a flowchart illustrating the status report/response reception process in step S806 of FIG. 8.

The CPU 301 updates the property of the corresponding entry in the device data management table 203-3 based on the ECHONET Lite frame 607 that is stored in the received frame data of status report or response (step S1001). In such a case, as "SEOJ" of the ECHONET Lite frame 607 stored in the received frame data of the data, the object identifier of the device 103 or the GW 102 for which the property value is to be updated is stored. Also, in the combinations of property values ("EPC1", "PDC1", "EDT1") through ("EPCn", "PDCn", "EDTn") in the ECHONET Lite frame 607, a combination of the items for the property name and the value of the property to be updated is stored. The CPU 301 identifies, in the device data management table 203-3, an entry in which the item value of "SEOJ" in the above frame is registered as the item for "EOJ". Then, CPU 301 updates, in the identified entry, the item values of "value" for each corresponding item for "property name" in the above combinations of the property names. Also, the CPU 301 registers the current date and time (the time and date at which the status report/response message is received) in the item for "date and time of update" corresponding to the item for "value" registered as the item for "EOJ".

Next, the CPU 301 decides whether or not the memory 302 includes a response-waiting property that corresponds to the received response message (step S1002). Specifically, the CPU 301 searches the memory 302 for a response-waiting property to which the same TID value as the TID value in the item for "TID" in the ECHONET Lite frame 607 stored in the frame data of the received response message has been assigned.

When the decision result is NO in step S1002, the switch 101 forwards the received status report message or response message to the destination port as it is. Specifically, the CPU 301 instructs the frame transfer engine 304 to relay and transmit the received status report message or response message as it is (step S1003). After confirming that a value representing multicast is set in the destination MAC address 602 of the frame data (see FIG. 6) of the status report message, the frame transfer engine 304 forwards that frame data to all the LAN interface units 305 illustrated in FIG. 3A.

A case when the decision result is YES in step S1002 is a case when the received message is a response message addressed to the switch 101 itself in response to the property value obtaining request message transmitted in step S907 in FIG. 9 and there is a response-waiting property. In such a case, the CPU 301 puts together a property value of a response-waiting property for which the memory 302 was searched in step S1002 and a property value in the received response frame data, and recomposes a property value obtaining response message (step S1004). In accordance with information of the requesting source GW 102 stored together with the response-waiting property, the CPU 301 generates frame data in which the above recomposed property value obtaining response message is stored as the ECHONET Lite frame 607 (see FIG. 6). The frame data is generated in a manner similar to the manner in the case of step S905 in FIG. 9.

The switch 101 returns the above property value obtaining response message to the destination that transmitted a property value obtaining request message corresponding to the property value obtaining response message (step S1003). Specifically, the CPU 301 requests the frame transfer engine 304 illustrated in FIG. 3A transmit frame data in which the property value obtaining response message composed in step S104 is stored. The frame transfer engine 304 transmits the frame data concerning the request from the LAN interface unit 305 in which the destination MAC address 602 of that frame data is stored as the connection destination MAC address.

After the process in step S1003, the CPU 301 terminates the status report/response reception process in step S806 illustrated in FIG. 8.

Figure 11:
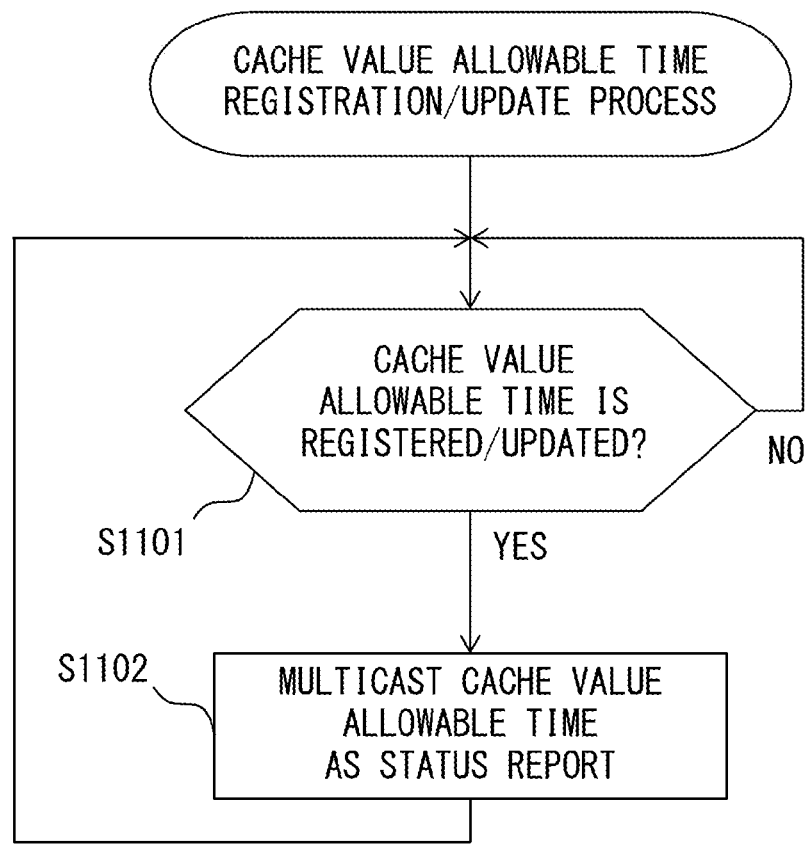
FIG. 11 is a flowchart illustrating a process of a cache value allowable time registration and update status report by the GW.

FIG. 11 is a flowchart illustrating a cache value allowable time registration/update status report process of the GW 102. In this process, the CPU 311 executes the cache value allowable time registration/update status report process program that was read from the storage 313 to the memory 312 in the hardware configuration example illustrated in FIG. 3B. This process is part of operations of the protocol processor 210 illustrated in FIG. 2.

The cache value allowable time registration interface 212 in the GW 102 illustrated in FIG. 2 receives registration or update of the cache value allowable time from the administrator or a service of a upper level system of the GW 102. As a result of this, the cache value allowable time registration interface 212 updates the ECHONET Lite object data management table 213 (FIG. 2) stored in the memory 312 or the storage 313 illustrated in FIG. 3B. Specifically, the cache value allowable time registration interface 212 registers or updates the item value of "cache value allowable time" in the ECHONET Lite object data management table 213 that has the data configuration example of FIG. 5.

Meanwhile, the CPU 311 of the GW 102 monitors whether or not the item value of "cache value allowable time" in the ECHONET Lite object data management table 213 is registered or updated (step S1101).

When the decision result is YES in step S1101, the CPU 311 in the GW 102 multicasts, as status report, the registered or updated cache value allowable time via the LAN interface unit 314 illustrated in FIG. 3A (step S1102). Specifically, in the source MAC address 601 and the source IP address 603 of the ECHONET Lite frame 607 of frame data illustrated in FIG. 6, the MAC address and IP address of the returning-source GW 102 are stored. Also, "value" corresponding to multicast transmission is stored in the destination MAC address 602. Further, as the item for "SEOJ" in the ECHONET Lite frame 607, the object identifier of the returning-source GW 102 is stored. Additionally, as the item for "EPC1" in the ECHONET Lite frame 607, the name "cache value allowable time" is stored, while the cache value allowable time value is stored as the item for "EDT1". Note that as the item for "RDC1", the number of bytes of the item value of "EDT1" has been stored.

After the process in step S1102, the CPU 311 terminates the cache value allowable time registration process explained in the flowchart illustrated in FIG. 11.

Receiving the frame data of the status report message of the cache value allowable time thus transmitted from the GW 102, the switch 101 executes steps S804-S806 in the proxy response process to be conducted at the reception of a frame illustrated in FIG. 8, and thereby processes that state report message in step S1001 in FIG. 10.

In step S1001, the CPU 301 illustrated in FIG. 3A extracts, from the device data management table 203-3 illustrated in FIG. 4, an entry of the type of "controller" in which the item value of "SEOJ" in the state report message of the cache value allowable time is stored. Then, the CPU 301 registers the cache value allowable time value of the item for "EDT1" in the status report message of the cache value allowable time as the item for "value" corresponding to "property name=cache value allowable time" in that entry.

In the above manner, based on a status report multicast from the GW 102 in accordance with the registration/update of the cache value allowable time in the GW 102, the cache value allowable time of that entry in the device data management table 203-3 of the switch 101 can be registered/updated.

The operation sequences based on the control processes exemplified by the above flowcharts illustrated in FIG. 7 through FIG. 11 will be explained below.

Figure 12:
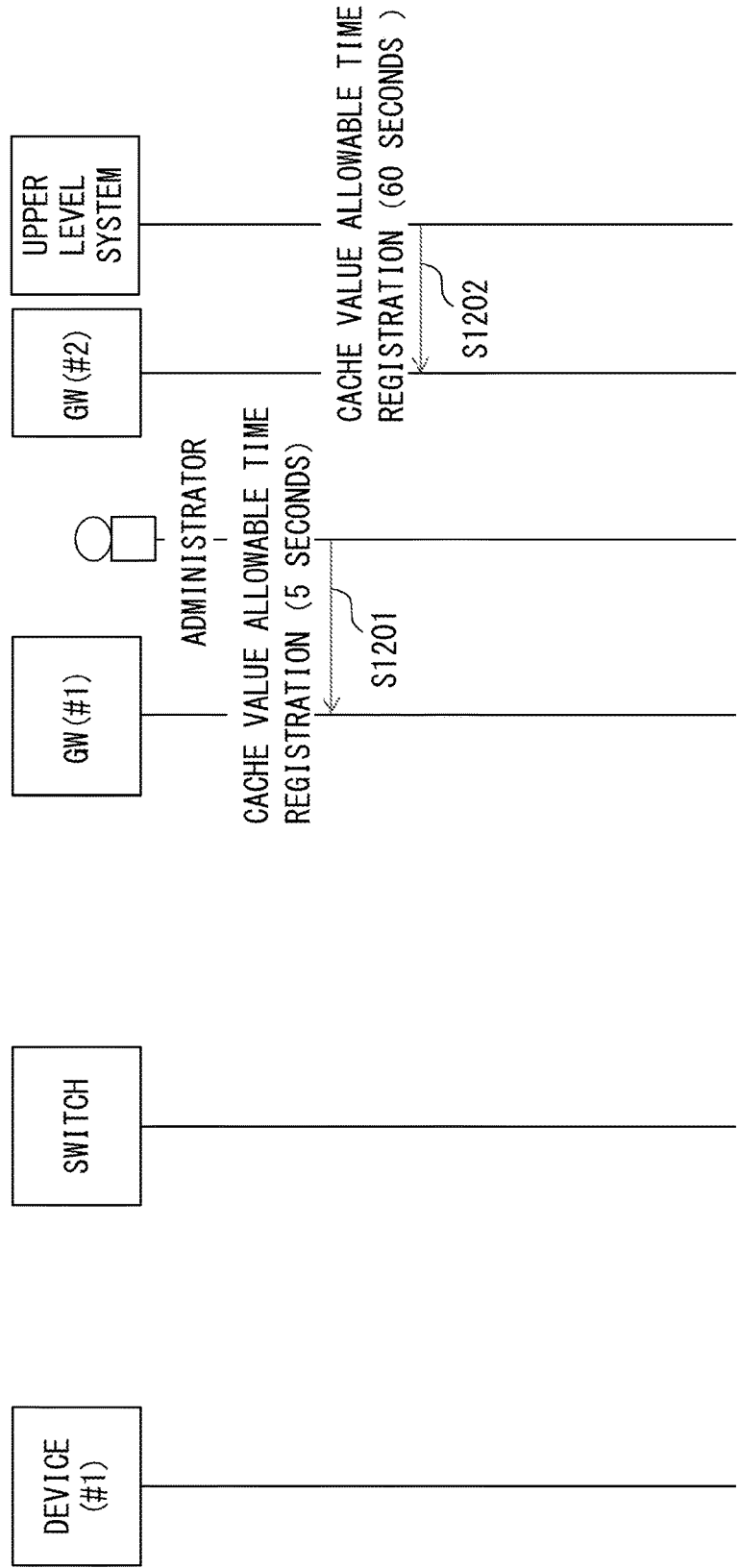
FIG. 12 illustrates a sequence example of cache value allowable time registration in the GW.

FIG. 12 illustrates a sequence example of cache value allowable time registration in the GW 102.

The cache value allowable time registration interface 212 in GW 102(#1) illustrated in FIG. 2 receives registration of a cache value allowable time from the administrator of service 1 of GW 102(#1). The time value is for example five seconds. As a result of this, the cache value allowable time registration interface 212 in GW 102(#1) registers "5 seconds" as the item for "cache value allowable time" in the ECHONET Lite object data management table 213 (FIG. 2) (step S1201 in FIG. 12).

The cache value allowable time registration interface 212 in GW 102(#2) in FIG. 2 receives registration of the cache value allowable time from a service of an upper level system. It is assumed for example that the time value is sixty seconds. As a result of this, the cache value allowable time registration interface 212 in GW 102(#2) registers "60 seconds" as the item for "cache value allowable time" in the ECHONET Lite object data management table 213 (FIG. 2) (S1202).

Figure 13:
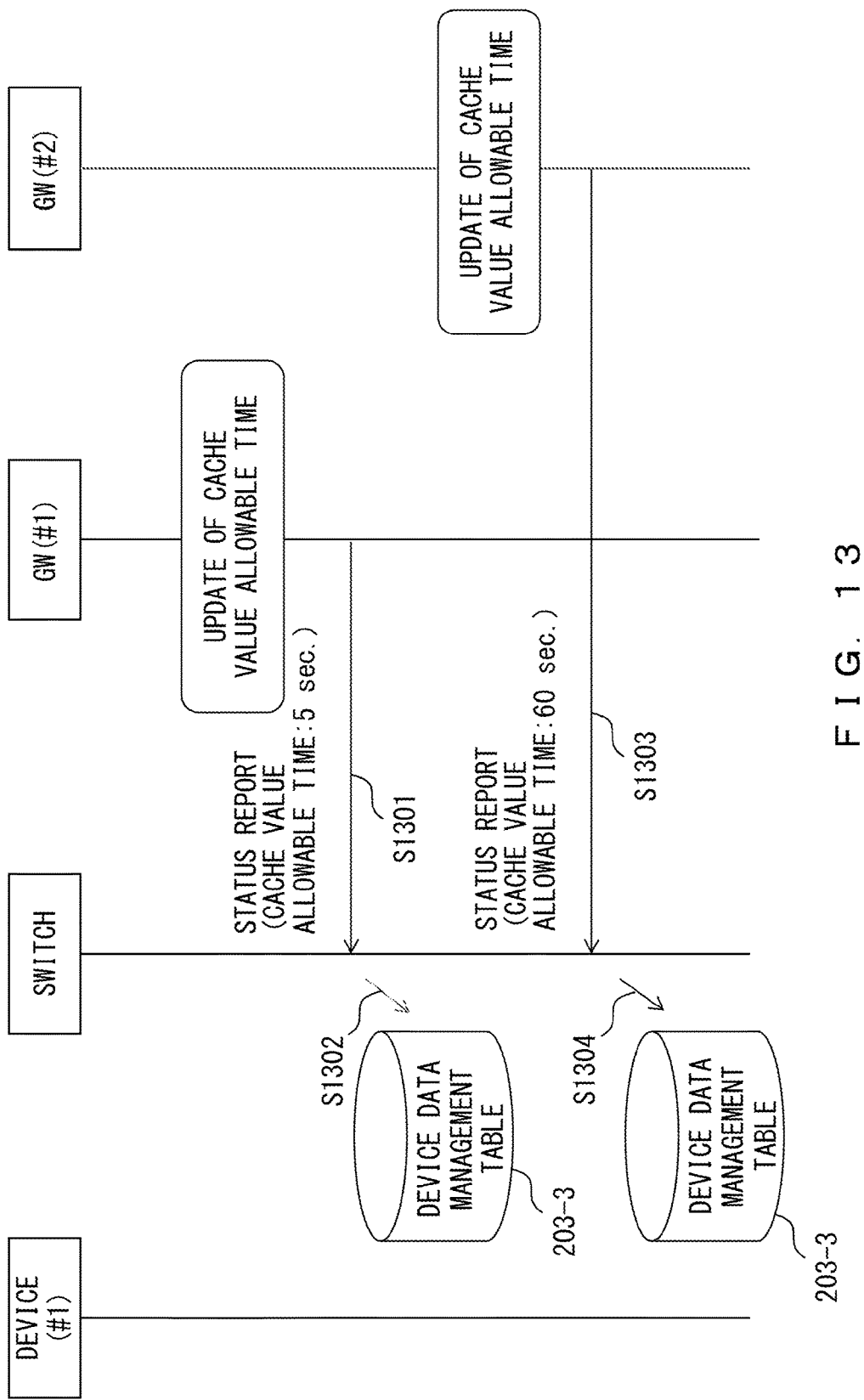
FIG. 13 illustrates a sequence example of a cache value allowable time registration status report process that follows the cache value allowable time registration in the GW.

FIG. 13 illustrates a sequence example of the cache value allowable time registration status report process. This sequence is performed after the cache value allowable time registration in GW 102(#1) and GW 102(#2) exemplified by the sequence example illustrated in FIG. 12.

The CPU 311 in GW 102(#1) executes the cache value allowable time registration/update status report process exemplified in the flowchart in FIG. 11. When "cache value allowable time=5 seconds" is registered as the item for "cache value allowable time" in the ECHONET Lite object data management table 213 of GW 102(#1), the CPU 311 detects the registration in step S1101 in FIG. 11. Then, the CPU 311 multicasts information of "registered cache value allowable time=5 seconds" as a status report in step S1102 in FIG. 11 (step S1301 in FIG. 13).

The frame data of the status report message including "cache value allowable time is 5 seconds" transmitted from GW 102(#1) is received by the frame transfer engine 304 via the LAN interface unit 305, illustrated in FIG. 3A, to which GW 102 (#1) is connected. The CPU 301 in the switch 101 receives the frame data of the above status report message from the frame transfer engine 304. The CPU 301 executes the process of receiving a frame in step S804-S806 illustrated in FIG. 8, and thereby executes step S1001 in FIG. 10. Thereby, "cache value allowable time is 5 seconds" in the above status report message is registered as the item for "value" corresponding to "property name of the entry of controller (#1) in the device data management table 203-3=cache value allowable time" (S1302).

Similarly in GW 102(#2), the CPU 311 executes the cache value allowable time registration/update status report process exemplified in the flowchart in FIG. 11. When "cache value allowable time is 60 seconds" is registered as the item for "cache value allowable time" in the ECHONET Lite object data management table 213 of GW 102(#2), the CPU 311 detects the registration in step S1101 in FIG. 11. In step S1102 in FIG. 11, the CPU 311 multicasts the registered "cache value allowable time is 60 seconds" as a status report (S1303).

The frame data of the status report message including "cache value allowable time is 60 seconds" transmitted from GW 102(#2) is received by the frame transfer engine 304 via the LAN interface unit 305 illustrated in FIG. 3A to which GW 102 (#2) is connected. The CPU 301 in switch 101 receives the frame data of the above status report message from the frame transfer engine 304. The CPU 301 executes the process of receiving a frame in step S804-S806 in FIG. 8, and thereby executes step S1001 in FIG. 10. Thus, "cache value allowable time is 60 seconds" in the above status report message is registered as the item for "value" corresponding to "property name of the entry of controller (#2) in the device data management table 203-3=cache value allowable time" (S1304).

The above sequence example of FIG. 13 is an example in which the switch 101 has been activated before GW 102(#1) and GW 102(#2) and the cache value allowable times of the respective GWs 102 are later registered in the switch 101.

Figure 14:
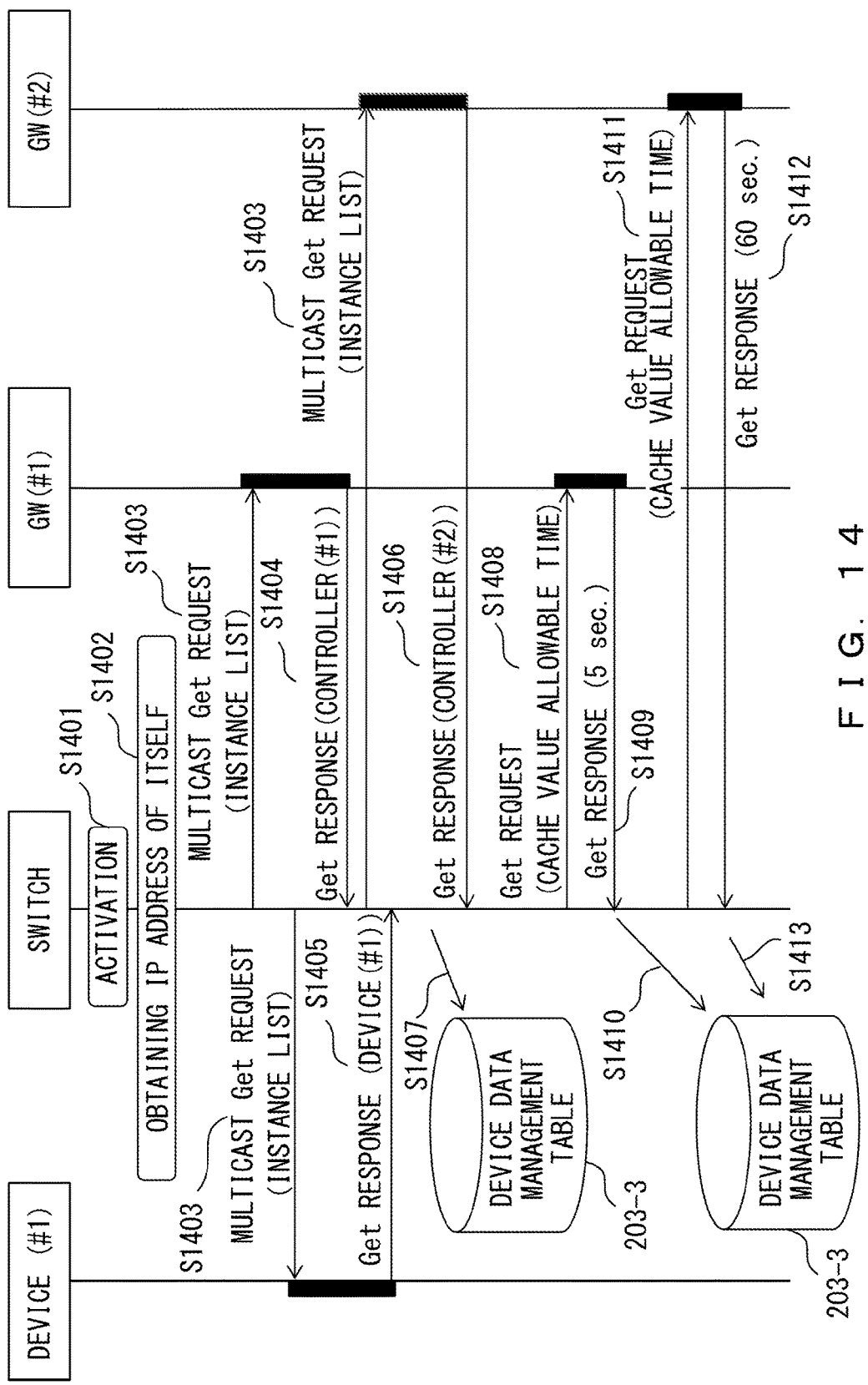
FIG. 14 illustrates a sequence example of an instance list request process and a cache value allowable time obtaining process executed when the switch is activated.

FIG. 14 illustrates a sequence example of the instance list request process and the cache value allowable time obtaining process executed when the switch 101 is activated.

When the switch 101 is activated (S1401), the CPU 301 starts the proxy response process, which is exemplified by the flowchart illustrated in FIG. 7. As a result of this, the CPU 301 obtains the IP address of the switch 101 itself in step S701 in FIG. 7 (S1402).

Thereafter, the CPU 301 multicasts the frame data of the instance list request message as a Get request in step S702 in FIG. 7 (s1403 in FIG. 14). This frame data reaches GW 102 (#1), device 103(#1), GW 102(#2), etc. via the respective LAN interface units 305 from the frame transfer engine 304 illustrated in FIG. 3A. At that moment, device 103(#2) for example has not been activated.

Upon receiving the above instance list request message, GW 102(#1), device 103(#1), GW 102(#2), etc. return instance list response messages storing the property names respectively managed by them. The response is made by Get response based on an ECHONET Lite protocol.

As a result of this, the CPU 301 receives the respective instance list response messages via the respective LAN interface units 305 and the frame transfer engine 304 illustrated in FIG. 3A in step S703 in FIG. 7 (steps S1404, S1405 and S1406). Then the CPU 301 generates an entry in which the item values of "device type", "MAC address", "IP address", "EOJ" and "property name" are set, in the device data management table 203-3 illustrated in FIG. 4 (S1407 in FIG. 14). For example, entries in which "device (#1), "controller (#1)", "controller (#2)", etc. are set as the items for "device type" are generated.

Further, when there is a device whose type is "controller" and whose property name includes "cache value allowable time", the CPU 301 transmits a cache value allowable time request message to such GW 102 in the process in steps S704 and S705 in FIG. 7.

The frame data of the cache value allowable time request message addressed to GW 102 (#1) reaches GW 102 (#1) from the frame transfer engine 304 via the LAN interface unit 305 to which GW 102(#1) is connected (S1408).

Upon receiving the above cache value allowable time request message, the CPU 311 in GW 102(#1) executes the following control operations. The CPU 311 reads, from the memory 312 etc., the cache value allowable time registered as the item for "cache value allowable time" in the ECHONET Lite object data management table 213 (see FIG. 2). In this example, "5 second" is obtained. The CPU 311 generates a cache value allowable time response message in which "cache value allowable time value is 5 seconds" is set, and returns the message to the switch 101 through the LAN interface unit 314 illustrated in FIG. 3B. This response is made based on Get response (S1409).

The CPU 301 in the switch 101 receives the above cache value allowable time response message via the LAN interface unit 305 illustrated in FIG. 3A to which GW 102 (#1) is connected and via the frame transfer engine 304. The CPU 301 extracts the cache value allowable time value from the cache value allowable time response message in step S706 in FIG. 7. Then, the CPU 301 registers "5 seconds" as the item for "value" that corresponds to "cache value allowable time" in the entry that corresponds to GW 102 (#1) in the device data management table 203-3.

The cache value allowable time request message addressed to GW 102 (#2) is processed in a similar manner (S1411), and "cache value allowable time value is 60 seconds" is extracted from the cache value allowable time response message received from GW 102(#2) (S1412). Then, in the entry corresponding to GW 102 (#2) in the device data management table 203-3, "60 seconds" is registered as the item for "value" that corresponds to "cache value allowable time" (S1413).

Contrary to the sequence example illustrated in FIG. 13, the sequence example illustrated in FIG. 14 explains a case where the switch 101 is activated after GW (#1) and GW 102 (#2) are activated, and a case where the switch 101 later requests and obtains a cache value allowable time from each of the GWs 102.

Figure 15:
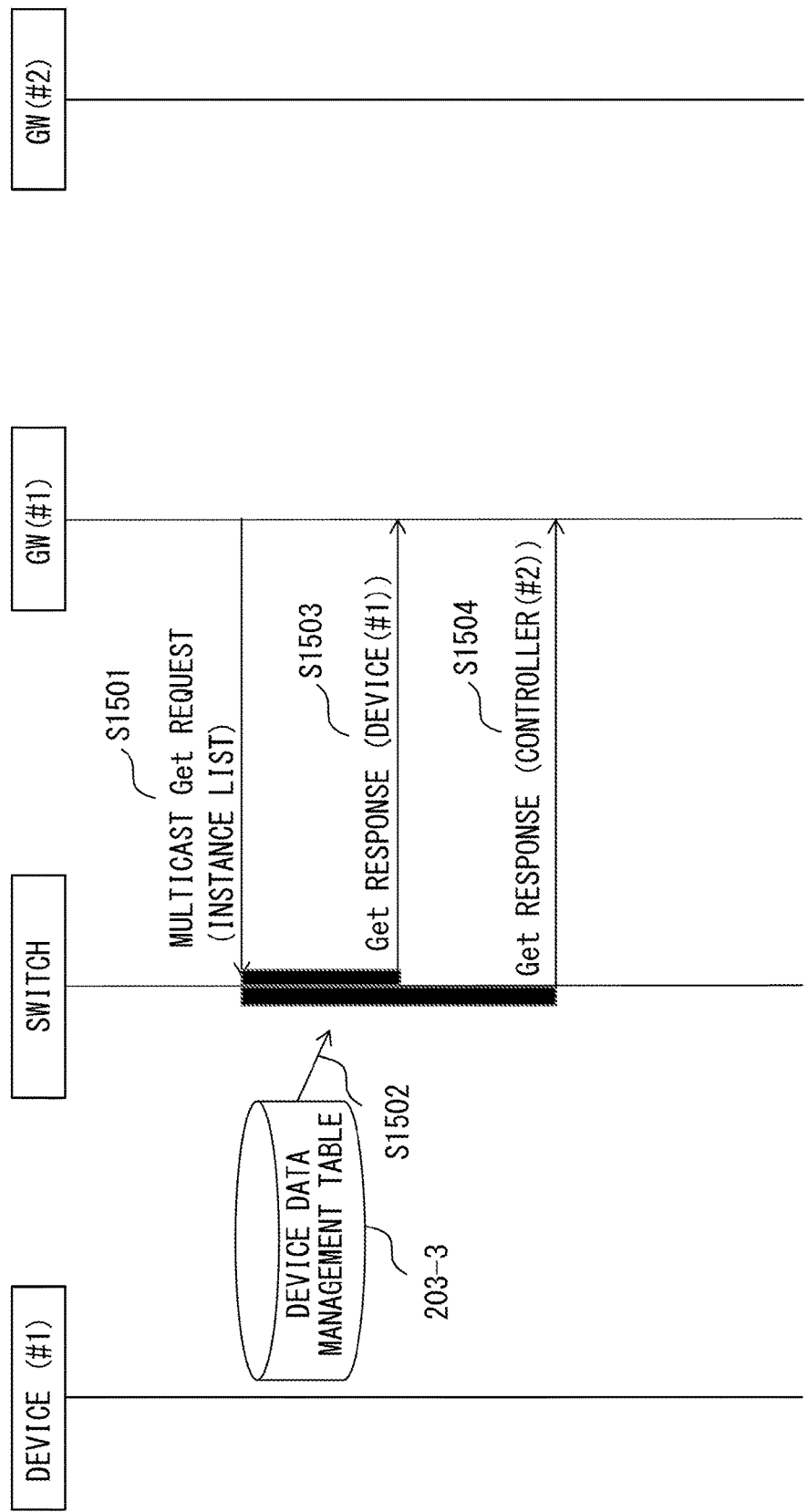
FIG. 15 illustrates a sequence example of an instance list obtaining request process (device detection process) started from the GW.

FIG. 15 illustrates a sequence example of the instance list obtaining request process (device detection process) started from for example GW 102(#1). When for example GW 102

(#1) is activated later, it may be desirable for a service operating in GW 102 (#1) to recognize which device is connected to the network.

In such a case, GW 102 (#1) multicasts an instance list obtaining request message. The CPU 311 in GW 102(#1) sets "0x6X", which represents a data obtaining request, in the item for "ESV" in the ECHONET Lite frame 607 of the frame data of the transmitted frame. In response to this, the 301 in the switch 101 receives the frame data of the above instance list obtaining request message via each of the LAN interface units 305 and the frame transfer engine 304 illustrated in FIG. 3A (S1501).

The CPU 301 activates the proxy response process upon receiving the frame, and executes steps S801, S803, S804 and S805 in FIG. 8. Then step S902 in FIG. 9 is executed when the decision result is YES in step S901. The CPU 301 generates a list of instances registered in the respective entries in the device data management table 203-3, and makes a response to the source of the instance list obtaining request message (S1502).

In such a case, the CPU 301 generates an instance list obtaining response message based on Get response that proxies the device in each entry, and makes a response to GW 102(#1) (S1503 and S1504 in FIG. 14). Thereby, in FIG. 15, GW 102 (#1) receives each instance list obtaining response message as if device 103 (#1) and GW 102 (#2) (controller (#2)) made responses.

In reality, no access is made to device 103(#1) or GW 102 (#2) and the switch 101 makes a proxy response, the number of accesses to the respective devices 103 is reduced, and transmission of request messages to the devices 103 can be suppressed. Also, because there is also a case where it is desirable for the GW 102 (#1) to recognize the connection status of a different GW such as GW 102(#2), a proxy response may also be made for GW 102(#2) (S1504). As a result of this, transmission of messages to the GWs 102 is also suppressed, bringing about an effect of the reduction in the traffic in the entire network.

Figure 16:
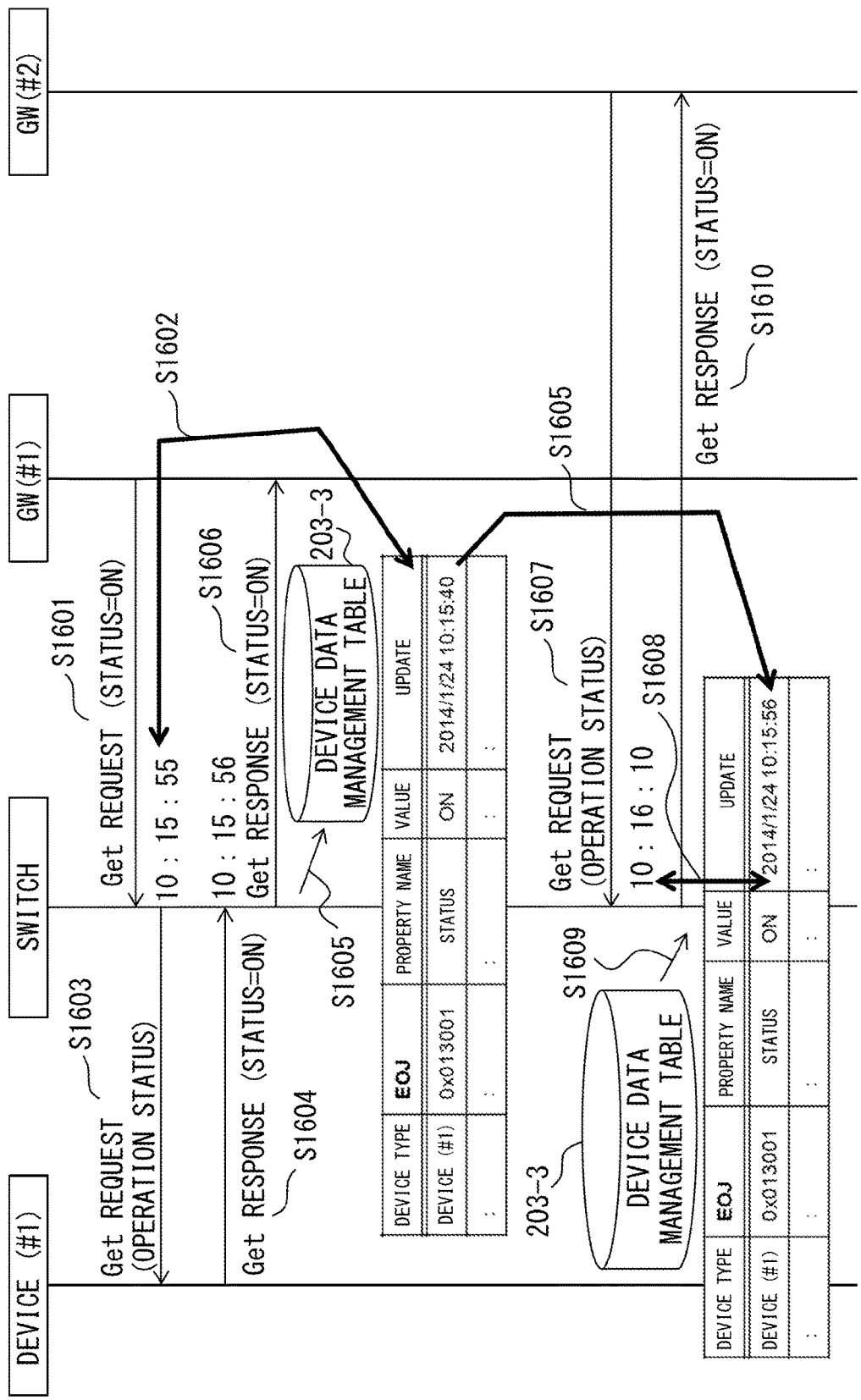
FIG. 16 and FIG. 17 illustrate a sequence example of a property value obtaining request process started from the GW.

FIG. 16 illustrates a sequence example of the property value obtaining request process started from the GW 102.

First, for example GW 102 (#1) transmits a property value obtaining request message based on Get request to device 103 (#1) (S1601). The CPU 311 in GW 102 (#1) sets the next value from an instance list that has been obtained in advance (see FIG. 15) in the ECHONET Lite frame 607 of the frame data of the frame to be transmitted. The CPU 311 sets the object identifier of GW 102 (#1) "0x05FF01" (see the item value of "EOJ" in the entry of controller (#1) illustrated in FIG. 4) as the item for "SEOJ". The CPU 311 sets the object identifier of device 103 (#1) "0x013001" (see the item value of "EOJ" in the entry of device (#1) in FIG. 4) as the item for "DEOJ". Further, the CPU 311 sets "EPC1=operation status" as the requesting property. In response to this, the CPU 301 in the switch 101 receives the frame data of the above property value obtaining request message via the LAN interface units 305 to which GW 102(#1) is connected and the frame transfer engine 304 illustrated in FIG. 3A (S1601).

Upon receiving a frame as illustrated in FIG. 8, the CPU 301 activates the proxy response process to execute steps S801, S803, S804 and S805, and also executes step S903 illustrated in FIG. 9 when the decision result is NO in step S901. The CPU 301 extracts "SEOJ=0x05FF01", "DEOJ=0x013001" and the requested property "EPC1=operation status" from the property value obtaining request message. The CPU 301 identifies an entry of device 103 (#1) whose item value of "EOJ" is "0x013001" (see FIG. 4). The CPU 301 calculates a difference between "date and time of update (2014/01/24 10:15:40)" corresponding to "property name=operation status" in that entry and the reception time of that message "2014/1/24 10:15:55" to obtain "15 seconds". The CPU 301 extracts "value (5 seconds)" corresponding to "property name=cache value allowable time" from the entry of the controller (#1) whose item value of "EOJ" is "0x05FF01" (=GW 102(#1)) in the device data management table 203-3. In step S904 in FIG. 9, the CPU 301 decides that the above difference of "15 seconds" is not within the above cache value allowable time of "5 seconds", and the process proceeds to step S907 in FIG. 9 (S1602).

In step S907 in FIG. 9, the CPU 301 recomposes a property value obtaining request message in which "EPC1" of requested property whose difference time was not within the cache value allowable time has been set. The CPU 301 transmits that property value obtaining request message to device 103 (#1) as Get request (S1603).

Device 103(#1) that has received the above property value obtaining request message returns, as Get response, a property value obtaining response message in which property value "EDT1" corresponding to requested property "EPC1=operation status" is "ON" has been set. In addition to this, "SEOJ=object identifier of device 103(#1) itself (that is 0x013001)" and "ESV=0x7X" are set. In response to this, the CPU 301 in the switch 101 receives the frame data of the above property value obtaining response message via the LAN interface unit 305 connected to device 103(#1) and the frame transfer engine 304 illustrated in FIG. 3A (S1604).

As a result of this, the CPU 301 activates the proxy response process upon receiving a frame illustrated in FIG. 8, and executes steps S801 S803 and S804 in FIG. 8. The CPU 301 executes step S806 in FIG. 8 after extracting "ESV=0x7X" from the message and determining the value, and further executes s1001 in FIG. 10, which illustrates detailed contents of step S806. The CPU 301 extracts property value "EDT1" corresponding to requested property "EPC1=operation status=ON" and "SEOJ=0x013001" from the received property value obtaining response message. The CPU 301 identifies an entry of device 103(#1) whose item value of "EOJ" is "0x013001" in the device data management table 203-3 (see FIG. 4). The CPU 301 updates, to "ON", the item value of "value" that corresponds to "property name=operation status" in that entry, and registers current time "2014/1/24 10:15:56" as the item value of "date and time of update" (S1605).

After the decision result has become NO in step S1002 in FIG. 10, the CPU 301 executes step S1003. The CPU 301 forwards, via the frame transfer engine 304 illustrated in FIG. 3A, the received property value obtaining response message as it is to the LAN interface unit 305 to which GW 102(#1) is connected. As a result of this, a property value obtaining response message is reported based on Get response to GW 102 (#1) (S1606).

In the above manner, GW 102 (#1) can obtain the latest property value "ON" corresponding to requested property "operation status" for device 103(#1).

Next, GW 102(#2) transmits to device 103(#1) a property value obtaining request message, based on Get request, in which "EPC1=operation status" has been set as the requested property. This operation is similar to the operation of the case of S1601 for GW 102(#1). In response to this, the CPU 301 in the switch 101 receives the frame data of the above property value obtaining request message via the LAN interface unit 305 to which GW 102 (#2) is connected and the frame transfer engine 304 illustrated in FIG. 3A (S1607).

As a result of this, similarly to the case of S1602, the CPU 301 calculates a time difference between item value of "date and time of update" of the requested property and the reception time of the above message in the entry of device 103 (#1) in the device data management table 203-3 in step S903 in FIG. 9. Specifically, the CPU 301 calculates difference between "date and time of update (2014/1/24 10:15:56)" corresponding to "property name=operation status" and the "reception time of the message (2014/1/24 10:16:10)" to obtain "14 seconds". The CPU 301 extracts "value" corresponding to "property name=cache value allowable time" from the entry of controller (#2) (=GW 102 (#2)) in the device data management table 203-3 in step S904 similarly to a case in step S1602. That is, "60 seconds" is obtained. In step S904, the CPU 301 decides that the above difference time of "14 seconds" is within the above cache value allowable time of "60 seconds", and the process proceeds to the process in step S905 (S1608).

The CPU 301 reads the property value corresponding to "property name=operation status=ON" in the entry for device 103(#1) in the device data management table 203-3 in steps S905 and S906 in FIG. 9.

As a result of this, the CPU 301 generates a property value obtaining response message in which property value corresponding to "requested property name=operation status=ON" has been set, and returns it to GW 102(#2) as a proxy response (S1610).

In the above manner, it is possible for GW 102(#2) to obtain the latest property value corresponding to "requested property name=operation status=ON" within a range of cache value allowable time corresponding to GW 102(#2), that is "60 seconds", through a proxy response made by the switch 101. In such a case, a proxy response is made to the property value obtaining request message transmitted from GW 102 (#2) without transferring the property value obtaining request message to device 103(#1), and accordingly it is possible to reduce process loads on device 103(#1).

Figure 17:
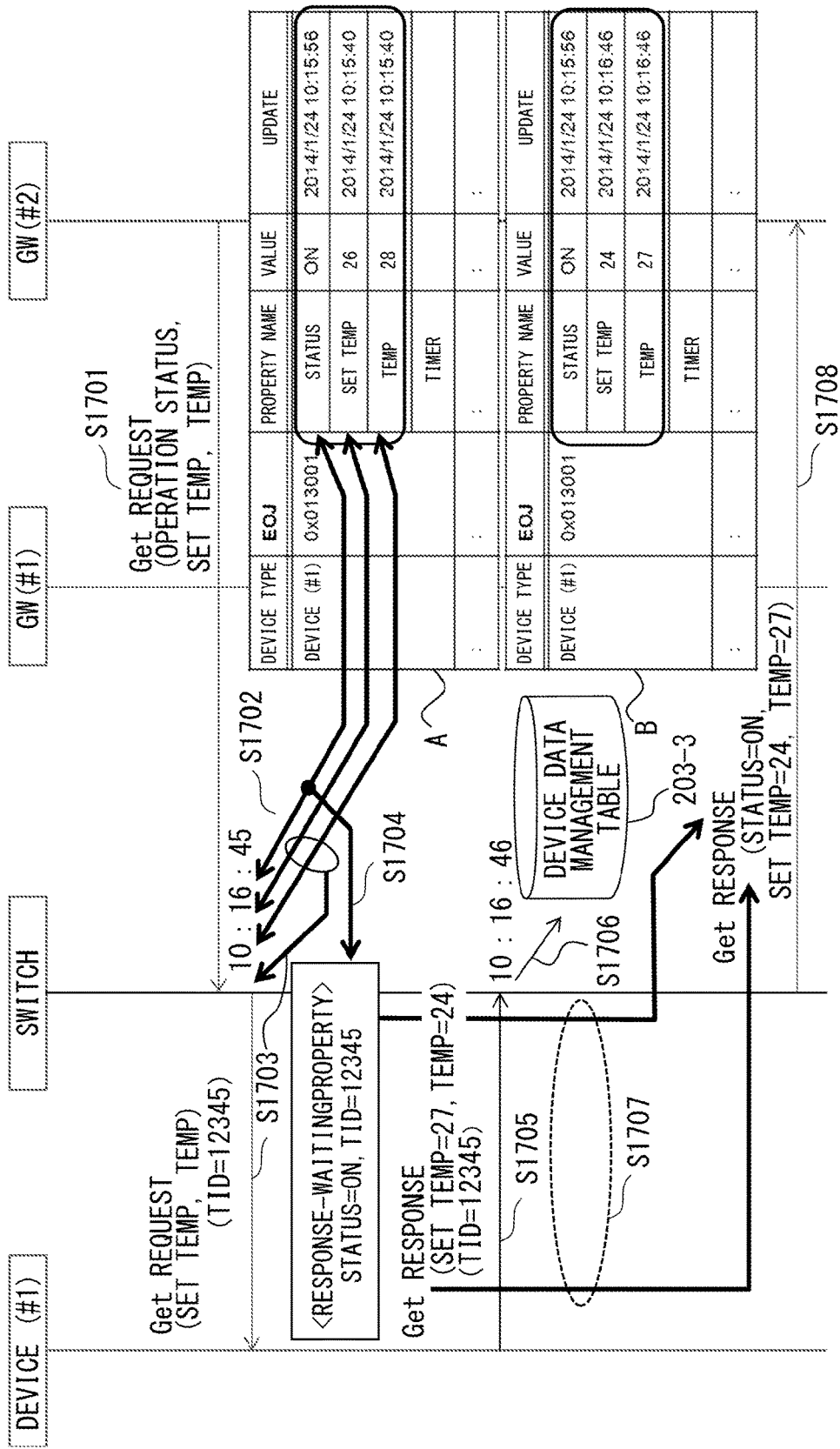

FIG. 17 illustrates another sequence example of the property value obtaining request process started from the GW 102.

In FIG. 17, a state is started in which the item for "value" corresponding to "property name=operation status" in the entry of the device 103 (#1) in the device data management table 203-3 has been updated to the latest status in S1609 in FIG. 16. The device data management table 203-3 in this state contains the contents illustrated as portion A in FIG. 17. In other words, the item value of "date and time of update" for "property name=operation status" is "2014/1/24 10:15:56" in the entry of device 103(#1). However, the item values of "date and time of update" in the other entries ("property name=set temperature" and "property name=temperature") are "2014/1/24 10:15:40", which are not the latest state.

It is assumed in the above state that GW 102(#2) transmitted to device 103(#1) a property value obtaining request message based on Get Request in which the three requested properties of "EPC1=operation status", "EPC2=set temperature" and "EPC3=temperature" have been set. This message is transmitted in a manner similar to the case in S1601 in FIG. 16. In response to this, the CPU 301 in the switch 101 receives the frame data of the above property value obtaining request message via the LAN interface unit 305 to which GW 102(#2) is connected and the frame transfer engine 304 illustrated in FIG. 3A (S1701).

Similarly to the case of S1602 in FIG. 16, the CPU 301 calculates a difference between the item value of "date and time of update" and the reception time of the above message for each requested property in the entry of device 103 (#1) in portion A in the device data management table 203-3 in FIG. 17. Specifically, for "requested property=operation status", the difference time between "date and time of update=2014/1/24 10:15:56" and the reception time of the message "2014/1/24 10:16:45" is calculated. Thus, "49 seconds" is obtained. Also, for "requested property set temperature", the difference time between "date and time of update=2014/1/24 10:15:40" and the reception time of the message "2014/1/24 10:16:45" (that is, "65 seconds") is calculated. Further, for "requested property=operation status", the difference time between "date and time of update=2014/1/24 10:15:40" and the reception time of the message "2014/1/24 10:16:45" (that is, "65 seconds") is calculated. Meanwhile, similarly to the case in S1602 in FIG. 16, the CPU 301 extracts the "value" of "property value=cache value allowable time=60 seconds" form the entry of the controller (#2) (=GW 102 (#2)) in the device data management table 203-3. Then the CPU 301 decides in step S904 in FIG. 9 that only the difference time of "requested property=operation status=49 seconds" is within the above cache value allowable time, and the difference times of "requested property=set temperature" and "requested property=temperature" are longer than the cache value allowable time. Then the process of the CPU 301 is moved to S907 in FIG. 9.

In step S907 in FIG. 9, the CPU 301 recomposes a property value obtaining request message in which requested properties ("set temperature" and "temperature") whose difference times are longer than the cache value allowable time are set. The CPU 301 transmits the property value obtaining request message to device 103(#1) as a Get request (S1703). Then, the CPU 301 sets a uniquely-defined value ("12345" is employed as an example in FIG. 17) as the item for "TID" in the ECHONET Lite frame 607 in the frame data illustrated in FIG. 6 that is part of the property value obtaining request message.

For item "value" of requested property whose difference time is within the cache value allowable time ("operation status"=ON") that has been determined in step S908 in FIG. 9, the CPU 301 temporarily stores this information in the memory 302 as a response-waiting property (s1704). At this time, the CPU 301 also stores the TID value that was added in step S907, as part of the response-waiting property. In addition, the CPU 301 also stores the information of GW 102 (#2) that is the source (requesting source) of the property value obtaining request message together with the above pieces of information, although this is not illustrated in FIG. 17.

Device 103 (#1) that receives the above property value obtaining request message executes the control operations as described below. Device 103(#1) returns, as a Get response, a property value obtaining response message in which, similarly to the case in S1604 in FIG. 16, property value "EDT1=24 degrees" and property value "EDT2=27 degrees" that respectively correspond to requested property "EPC1=set temperature" and requested property "EPC2=temperature" have been set. Note that, in the case of the example illustrated in FIG. 17, the device 103(#1) returns a property value obtaining response message after adding to this message the item value of "TID" ("12345" in the example illustrated in FIG. 17) that was added to the property value obtaining request message. In response to this, the CPU 301 in the switch 101 receives the frame data of the above property value obtaining response message via the LAN interface unit 305 to which device 103(#1) is connected and the frame transfer engine 304 illustrated in FIG. 3A (S1705).

As a result of this, similarly to the case in S1605 in FIG. 16, the CPU 301 conducts the following update on the entry of device 103(#1) in the device data management table 203-3 of the data configuration example of FIG. 4 in S1001 in FIG. 10. The CPU 301 updates the item value of "value" corresponding to "property name=set temperature" and the item value of "value" corresponding to "property name=temperature" to "24 degrees" and "27 degrees", respectively. Further, the CPU 301 registers the current time "2014/1/24 10:16:46" as the respective item values of "date and time of update" (S1706 in FIG. 17). As a result of this, the entry for device 103(#1) in the device data management table 203-3 is updated to the contents illustrated in portion B in FIG. 17.

At that moment, the memory 302 stores a response-waiting property containing the TID value identical to the TID value added to the above property value obtaining response message (i.e., "12345") based on S1704. After the decision result in step S1002 in FIG. 10 has become YES based on the decision that the above TID values are identical to each other, the CPU 301 executes step S1004. The CPU 301 puts together the value of response-waiting property "operation status=ON" and the value of requested properties in the property value obtaining response message "set temperature=27" and "temperature=24" and recomposes a property value obtaining response message. The CPU 301 generates frame data in which the above property value obtaining response message is stored, based on the information on the GW 102(#2) stored together with the response-waiting property in step S1003 in FIG. 10 (S1707). Then the CPU 301 returns the frame data in which the above property value obtaining response message is stored to GW 102(#2) as a proxy response (S1708).

In the above manner, in the case illustrated in FIG. 17, the switch 101 returns a cache value in the device data management table 203-3 as a proxy response for a requested property with a difference time that is within the cache value allowable time of GW 102(#2). On the other hand, the switch 101 returns the latest property value that was newly obtained from device 103(#1), as a proxy response for a requested property with a difference time that is longer than the cache value allowable time. Thus, while the number of inquiries to the devices 103 is reduced, the present embodiment makes it possible for the switch 101 to return to the GW 102, as a proxy response, latest data that is within a time range allowed by the GW 102.

Figure 18:
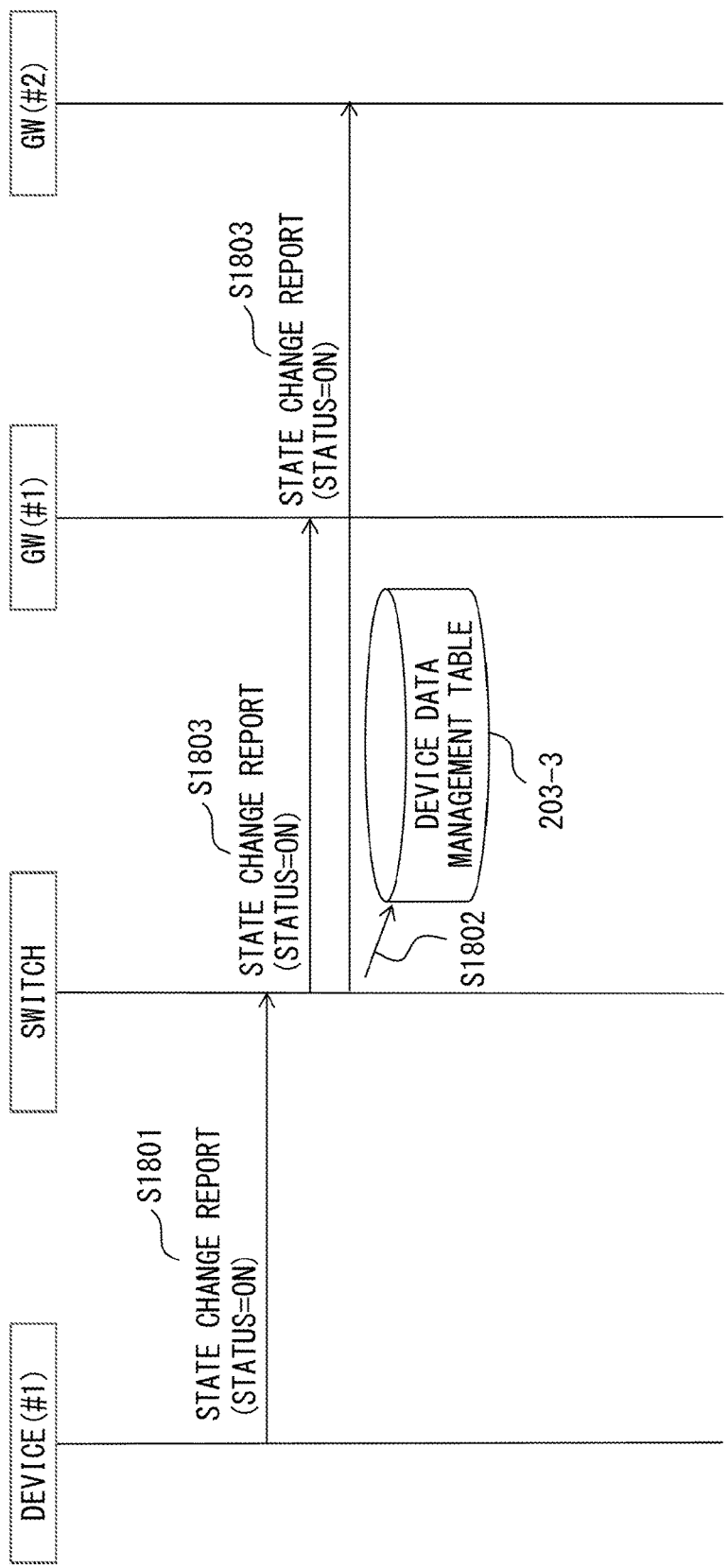
FIG. 18 illustrates a sequence example of a status report process started from the device.

FIG. 18 illustrates a sequence example of a status report process started from the device 103.

The CPU 301 in the switch 101 receives a status report message in which a latest property value is stored from the device 103 via the LAN interface unit 305 to which the device 103 is connected and the frame transfer engine 304 illustrated in FIG. 3A (S1801). In the example illustrated in FIG. 18, "ON" as the value of "property=operation status" is stored in the status report message.

As a result of this, similarly to the case in S1605 in FIG. 16, the CPU 301 conducts the following update on the entry of device 103(#1) in the device data management table 203-3 illustrated in FIG. 4 in S1001 in FIG. 10. The CPU 301 updates the item value of "value" corresponding to "property name=operation status" to "ON" and sets the current time as the item value of "date and time of update" (S1802).

After the decision result has become NO in step S1002 in FIG. 10, the CPU 301 instructs, in step S1003, the frame transfer engine 304 illustrated in FIG. 3A to forward the received status report message as it is. After confirming that a value representing multicast is set in the destination MAC address 602 of the frame data (see FIG. 6) of the status report message, the frame transfer engine 304 forwards that frame data to all the LAN interface units 305 illustrated in FIG. 3A. As a result of this, the status report message from device 103 (#1) reaches GW 102(#1) and the GW102(#2) (S1803). Each of the GWs 102 updates the property value managed by itself based on the reported property value.

Figure 19:
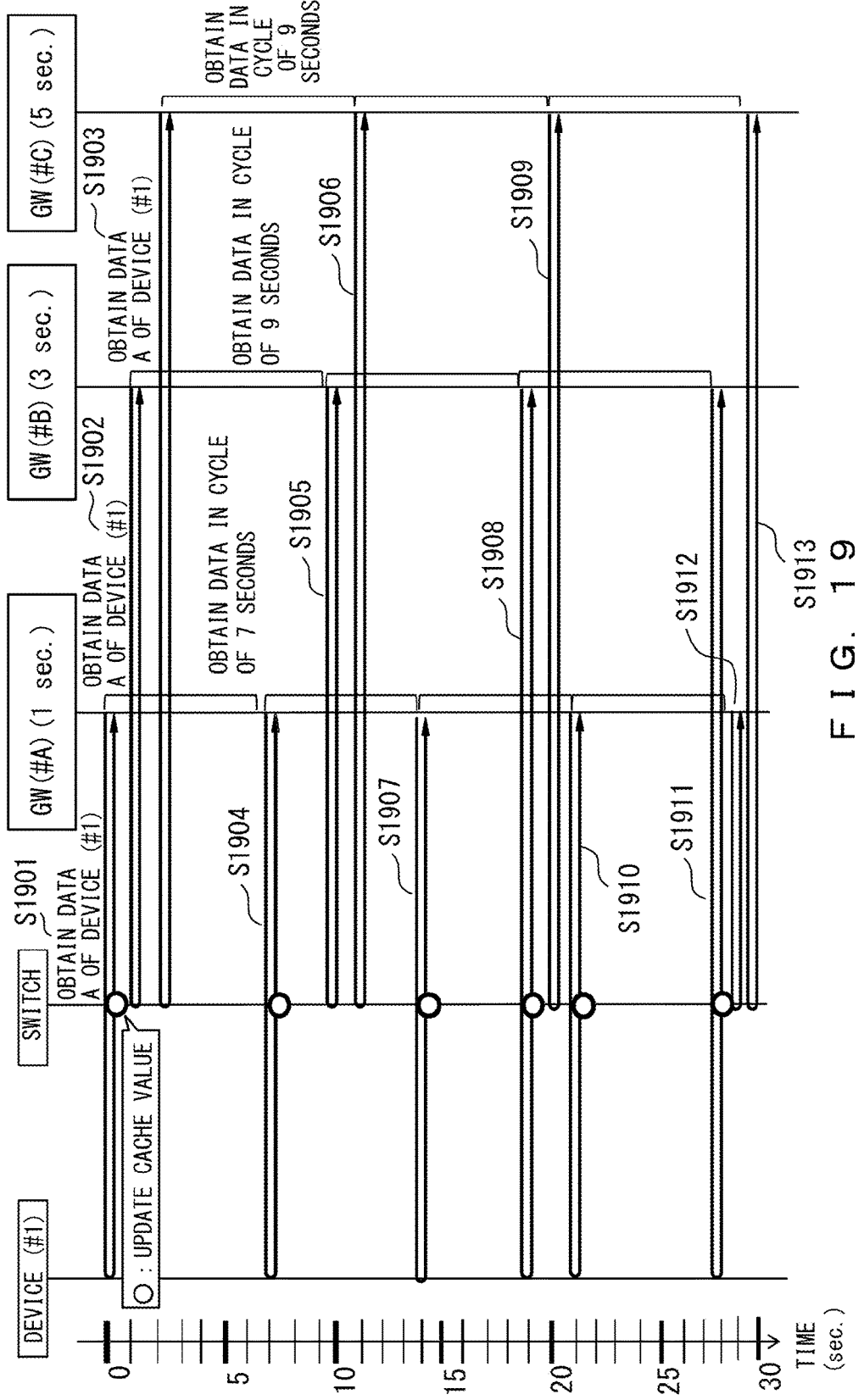
FIG. 19 illustrates a sequence example explaining effects of the present embodiment.

FIG. 19 illustrates a sequence example explaining effects of the present embodiment.

It is assumed for example that GWs 102(#A), 102 (#B) and 103(#C) has different cache value allowable times "1 second", "3 seconds" and "5 seconds" and that the GWs respectively obtain the same property of the same device, i.e. device 103(#1), in cycles of "7 seconds", "9 seconds" and "9 seconds", respectively.

In the sequence example in FIG. 19, the switch 101 stores, in the device data management table 203-3, data obtained from device 103 (#1) in response to the property value obtaining request from GW 102(#A) in S1901 or S1904, and simultaneously makes a response to GW 102(#A). The property value obtaining requests in and before the second cycles for GWs 102 (#B) and 102 (#C) are made (S1902, S1903, S1905 and S1906) have been made within the cache value allowable times of these GWs. Accordingly, the switch 101 returns data A, which has been cached in the device data management table 203-3, as a proxy response. Thus, the above property value obtaining request is not transmitted to device 103 (#1) and the number of frames that reaches device 103(#1) is reduced.

In the third cycle, the switch 101 stores, in the device data management table 203-3, data obtained from device 103(#1) in response to the property value obtaining request from GW 102 (#A) in S1907, and simultaneously makes a response to GW 102(#A). When the property value obtaining request is thereafter received from GW 102(#B), the cache value allowable time of GW 102(#B) has elapsed. In other words, data in the device data management table 203-3 at this timing is not fresh for GW 102(#B). Accordingly, the switch 101 accesses device 103 (#1) based on the property value obtaining request from GW 102 (#B) in S1908, and transmits to GW 102 (#B) the latest data that was newly obtained from device 103 (#1) in response to that access. Thus, it is possible to return data to the requesting source GW 102 within the cache value allowable time specified by the requesting source GW 102.

Also, in the fourth cycle, a property value obtaining request has been transmitted from GW 102(#A) in S1910, which comes immediately after S1909, in which GW 102 (#B) obtained data. In such a case, the switch 101 can return data cached in the device data management table 203-3 also to GW 102(#A), which has the shortest cache value allowable time, leading to the reduction in the number of frames that reach device 103 (#1).

In the above manner, the present embodiment makes it possible to reduce the number of frames that reach the devices 103 within an extent that is allowed by a service of a requesting source by managing a cache value allowable time for each requesting source instead of managing one cache value allowable time in the switch 101.

Note that it is not always necessary to make a cache value allowable time correspond to a requesting source GW 102, and a cache value allowable time may be specified based on various factors so that the amount of communications between the GWs 102 and the devices 103 is appropriate.

In the above manner, according to the present embodiment, when there is a request from the GWs 102 for obtaining data of the devices 103 such as a home appliance, a sensor, etc., the switch 101 returns cache data as a proxy response in accordance with cache value allowable times that have been set optimally (set for each service for example). This reduces the number of requests to the same device 103 for obtaining property values and reduces the consumption of resources such as the reception buffers etc. in the devices 103, making it possible to reduce processing loads such as loads of response processing etc. conducted in response to such obtaining requests.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A proxy device management system comprising
a device management apparatus,
a management target device, and
a proxy device management apparatus, wherein
the device management apparatus transmits an obtaining request for attribute information of the management target device,
the management target device transmits the attribute information corresponding to the obtaining request,
the proxy device management apparatus includes
a storage, and
a processor that performs a process which includes:
receiving the attribute information corresponding to the obtaining request from the management target device;
obtaining a first reception time when the attribute information is received;
storing the attribute information and time information indicating the first reception time in the storage;
receiving the obtaining request from the device management apparatus;
obtaining a second reception time when the obtaining request is received; and
performing a first operation or a second operation according to a difference between the first reception time and the second reception time, the first operation including transmitting the attribute information corresponding to the obtaining request stored in the storage to the device management apparatus, the second operation including transmitting to the management target device a delivery request for the attribute information, receiving from the management target device the attribute information corresponding to the delivery request, and transmitting to the device management apparatus the attribute information corresponding to the delivery request,
the management target device transmits the attribute information corresponding to the delivery request in response to receiving the delivery request, and
the device management apparatus receives, as a response to the obtaining request, the attribute information corresponding to the obtaining request transmitted from the proxy device management apparatus or the attribute information corresponding to the delivery request transmitted from the proxy device management apparatus.

2. The proxy device management system according to claim 1, wherein, in the performing the first operation or the second operation, the processor:
calculates a difference time between the first reception time indicated by the stored time information and the second reception time;
determines whether the difference time is shorter than a cache value allowable time which is specified as an available period for the stored attribute information;
performs the first operation as a response to the received obtaining request when it is determined that the difference time is shorter than the cache value allowable time; and
performs the second operation as a response to the received obtaining request when it is determined that the difference time is not shorter than the cache value allowable time.

3. The proxy device management system according to claim 1, wherein
the storage stores information indicating a cache value allowable time as attribute information of the device management apparatus, and
the processor transmits the attribute information stored in the storage to the device management apparatus when the difference is shorter than the cache value allowable time.

4. The proxy device management system according to claim 3, wherein
the processor obtains the information indicating the cache value allowable time by either transmitting a cache value allowable time request to the device management apparatus or receiving an update report of the cache value allowable time from the device management apparatus.

5. The proxy device management system according to claim 4, wherein
the processor receives information indicating the cache value allowable time that is specified based on an instruction from an administrator or an upper level system of the device management apparatus from the device management apparatus.

6. The proxy device management system according to claim 3, wherein
the storage stores data of a device data management table in which an entry is prepared for each management target device or each device management apparatus and the attribute information and the first reception time are registered for the entry.

7. The proxy device management system according to claim 6, wherein
in response to reception of an instance list obtaining request from the device management apparatus, the processor returns an instance containing address information or identification information and item name information of attribute information of the management target device or the device management apparatus registered in each entry of the device data management table to the device management apparatus by proxy for a management target device or a device management apparatus corresponding to the entry.

8. The proxy device management system according to claim 7, wherein
the processor returns the instance of address information or identification information and item name information of attribute information of the management target device or the device management apparatus registered in each entry in the device data management table to the device management apparatus by proxy for a management target device or a device management apparatus corresponding to the entry, by using frame data in which the address information stored in a corresponding entry is set as a source address, address information contained in the instance list obtaining request is set as a destination address and item name information of the attribute information is set in a data field.

9. The proxy device management system according to claim 6, wherein
address information of the device management apparatus set in frame data of the obtaining request is stored in the device data management table.

10. The proxy device management system according to claim 3, wherein
the attribute information is one of a plurality of pieces of attribute information requested by the obtaining request, and
the processor obtains from the storage a piece of attribute information for which the difference is smaller than the cache value allowable time,
the processor obtains others of the plurality of pieces of attribute information from the management target device, and
the processor transmits the pieces of attribute information obtained from the storage and the others of the plurality of pieces of attribute information obtained from the management target device when all of the plurality of pieces of attribute information are obtained.

11. A proxy device management method performed by a device management system which includes a device management apparatus, a management target device and a proxy device management apparatus, the proxy device management method comprising:

transmitting, by the device management apparatus, an obtaining request for attribute information of the management target device;
transmitting, by the management target device, the attribute information corresponding to the obtaining request;
receiving, by the proxy device management apparatus, the attribute information corresponding to the obtaining request from the management target device;
obtaining, by the proxy device management apparatus, a first reception time when the attribute information is received;
storing, by the proxy device management apparatus, the attribute information and time information indicating the first reception time in a storage included in the proxy device management apparatus;
receiving, by the proxy device management apparatus, the obtaining request from the device management apparatus;
obtaining, by the proxy device management apparatus, a second reception time when the obtaining request is received;
performing, by the proxy device management apparatus, a first operation or a second operation according to a difference between the first reception time and the second reception time, the first operation including transmitting the attribute information corresponding to the obtaining request stored in the storage to the device management apparatus, the second operation including transmitting to the management target device a delivery request for the attribute information, receiving from the management target device the attribute information corresponding to the delivery request, and transmitting to the device management apparatus the attribute information corresponding to the delivery request;
transmitting, by the management target device, the attribute information corresponding to the delivery request in response to receiving the delivery request; and
receiving, by the device management apparatus as a response to the obtaining request, the attribute information corresponding to the obtaining request transmitted from the proxy device management apparatus or the attribute information corresponding to the delivery request transmitted from the proxy device management apparatus.

* * * * *